US012712090B2

(12) United States Patent
Jurewicz et al.

(10) Patent No.: US 12,712,090 B2
(45) Date of Patent: Aug. 18, 2026

(54) INTEGRATED MONOPILE SYSTEM HAVING A NUCLEAR REACTOR

(71) Applicant: Blue Energy Global Inc., Brooklyn, NY (US)

(72) Inventors: Jacob Jurewicz, Edinburgh (GB); Paulina Mustafa, Edinburgh (GB); Jared Thomas Conway, Seattle, WA (US); Matthew Slotkin, Brooklyn, NY (US); Cody Jacobucci, Pitman, NJ (US)

(73) Assignee: Blue Energy Global Inc., Brooklyn, NY (US)

( * ) Notice: Subject to any disclaimer, the term of this patent is extended or adjusted under 35 U.S.C. 154(b) by 0 days.

(21) Appl. No.: 18/970,735

(22) Filed: Dec. 5, 2024

(65) Prior Publication Data

US 2025/0292923 A1 Sep. 18, 2025

Related U.S. Application Data

(60) Provisional application No. 63/606,373, filed on Dec. 5, 2023.

(51) Int. Cl.
*G21D 1/00* (2006.01)
*E02D 27/52* (2006.01)
(Continued)

(52) U.S. Cl.
CPC ............. *G21D 1/00* (2013.01); *E02D 27/525* (2013.01); *G21C 19/40* (2013.01); *G21F 5/008* (2013.01);
(Continued)

(58) Field of Classification Search
CPC .......... G21D 1/00; G21C 13/10; G21C 19/40; E02D 27/52; F17C 1/02; F17C 1/007
(Continued)

(56) References Cited

U.S. PATENT DOCUMENTS 2,461,118 A * 2/1949 Lippincott ................ F21L 4/00 362/205
3,158,546 A * 11/1964 Cordova ................ G21C 19/16 376/273
(Continued)

FOREIGN PATENT DOCUMENTS

CN 115387376 A 11/2022
WO WO 2015/135471 A1 9/2015
WO WO 2019/194676 A1 10/2019

OTHER PUBLICATIONS

Bowman, D. "NuScale Refueling." NuScale Power, LLC, PM-0515-14458, Jun. 3, 2015, slides 1-29.
(Continued)

*Primary Examiner* — Jack W Keith
*Assistant Examiner* — Daniel Wasil
(74) *Attorney, Agent, or Firm* — Fenwick & West LLP

(57) ABSTRACT

An inner sleeve for an integrated monopile system may be contained within an outer monopile that is installed in an earthen substrate. The inner sleeve includes at least one side wall, an open top end, a closed bottom end, and a cavity formed within the side wall, the open top end, and the closed bottom end. The cavity configured to house a power generator positioned inside the inner sleeve on or adjacent to the closed end, where the power generator being accessible through the open top end.

17 Claims, 33 Drawing Sheets

(51) Int. Cl.

| | |
|---|---|
| ***G21C 19/40*** | (2006.01) |
| ***G21F 5/008*** | (2006.01) |
| ***G21F 5/14*** | (2006.01) |
| *B63B 27/10* | (2006.01) |
| *B63B 35/44* | (2006.01) |
| *E02B 17/00* | (2006.01) |
| *G21C 13/10* | (2006.01) |
| *G21C 19/10* | (2006.01) |
| *G21C 21/00* | (2006.01) |
| *G21D 1/02* | (2006.01) |
| *G21D 3/00* | (2006.01) |

(52) U.S. Cl.
CPC ................ *G21F 5/14* (2013.01); *B63B 27/10* (2013.01); *B63B 2035/4446* (2013.01); *E02B 17/00* (2013.01); *E02B 2017/0039* (2013.01); *E02B 2017/0065* (2013.01); *E02D 2250/0023* (2013.01); *E02D 2300/002* (2013.01); *G21C 13/10* (2013.01); *G21C 19/10* (2013.01); *G21C 21/00* (2013.01); *G21D 1/02* (2013.01); *G21D 3/001* (2013.01)

(58) Field of Classification Search
USPC .................................................. 376/273, 347
See application file for complete search history.

(56) References Cited

U.S. PATENT DOCUMENTS

| | | | | |
|---|---|---|---|---|
| 4,815,894 | A * | 3/1989 | Copson | G21F 9/36 376/272 |
| 4,959,193 | A * | 9/1990 | Hunsbedt | G21C 15/18 376/273 |
| 2014/0014388 | A1 | 1/2014 | Maier | |
| 2015/0131769 | A1 | 5/2015 | Larrion | |
| 2019/0195201 | A1 * | 6/2019 | Thrue | F03D 13/20 |
| 2022/0321042 | A1 | 10/2022 | Larsen et al. | |
| 2023/0160369 | A1 | 5/2023 | Maher et al. | |
| 2024/0052807 | A1 * | 2/2024 | Macleay | F03D 13/25 |
| 2024/0339231 | A1 * | 10/2024 | Muller | G21D 9/00 |

OTHER PUBLICATIONS

PCT International Search Report and Written Opinion, PCT Application No. PCT/US2024/058738, Apr. 1, 2025, 14 pages.
PCT Invitation to Pay Additional Fees, PCT Application No. PCT/US2024/058738, Feb. 7, 2025, two pages.
United States Office Action, U.S. Appl. No. 18/970,749, filed Sep. 5, 2025, 15 pages.
United States Office Action, U.S. Appl. No. 18/970,749, filed Jan. 28, 2026, 14 pages.

* cited by examiner

Example Dimensions for Outer Monopile and Inner Sleeve

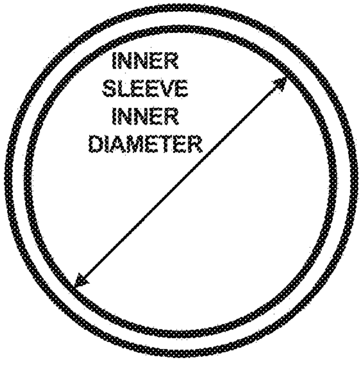

TOP VIEW CROSS SECTION

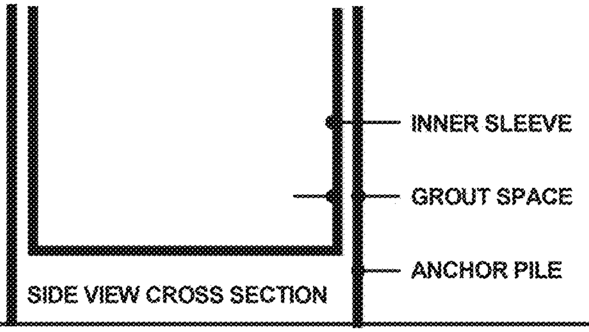

| | Outer Pile OD (outer diameter) | Outer Pile Thickness | Outer Pile ID (inner diameter) | Radial Grout Space | Inner Sleeve OD | Inner Sleeve Thickness | Inner Sleeve ID |
|---|---|---|---|---|---|---|---|
| Slenderness ratio of 100<br>r = Ø / t | 12000mm<br>12m | 120mm | 11760mm<br>11.76m | 150mm | 11460mm<br>11.46m | 120mm | 11220mm<br>11.22m |
| Slenderness ratio of 120<br>r = Ø / t | 12000mm<br>12m | 100mm | 11800mm<br>11.80m | 150mm | 11500mm<br>11.50m | 100mm | 11300mm<br>11.30m |
| Thickest walls possible | 12000mm<br>12m | 300mm | 11400mm<br>11.40m | 150mm | 11100mm<br>11.10m | 300mm | 10500mm<br>10.50m |

FIG. 19

INTEGRATED MONOPILE SYSTEM HAVING A NUCLEAR REACTOR

CROSS-REFERENCE TO RELATED APPLICATION

This application claims the benefit of, and priority to, U.S. Provisional Patent Application Ser. No. 63/606,373, "Offshore Power Generation Facility," filed Dec. 5, 2023, the subject matter of which is incorporated by reference in its entirety.

BACKGROUND

1. Technical Field

The application is generally related to components, systems, facilities, and processes for power generation.

2. Description of Related Art

As the world population increases, so does the need to provide affordable power. Although traditional power generation facilities such as coal, oil, and gas-burning plants may still provide cost-effective means of providing power, growing concern over energy security, fossil fuel price volatility, and the effects of greenhouse gases has led many in the industry to search for cleaner alternatives. Although there are many carbon-neutral options such as hydroelectric, geothermal, solar, and wind for the generation of power, each of these options tends to have drawbacks. For example, hydroelectric plants and wind power facilities have tremendous up-front costs and potentially adverse effects on wildlife, whereas solar farms require large tracts of land and, often, the removal of large numbers of trees. Wind and solar also are intermittent resources.

A clean, reliable, and effective option for carbon-neutral power generation—nuclear power—has been known for quite some time. However, large up-front costs, time delays in construction, radioactive waste disposal, and past accidents leading to the unintended release of radioactive products to the environment have led many to disregard nuclear power as a viable option.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 19 is a table listing example dimensions of an outer monopile and an inner sleeve, in accordance with an embodiment of the present disclosure.

DETAILED DESCRIPTION

Figure 1A:
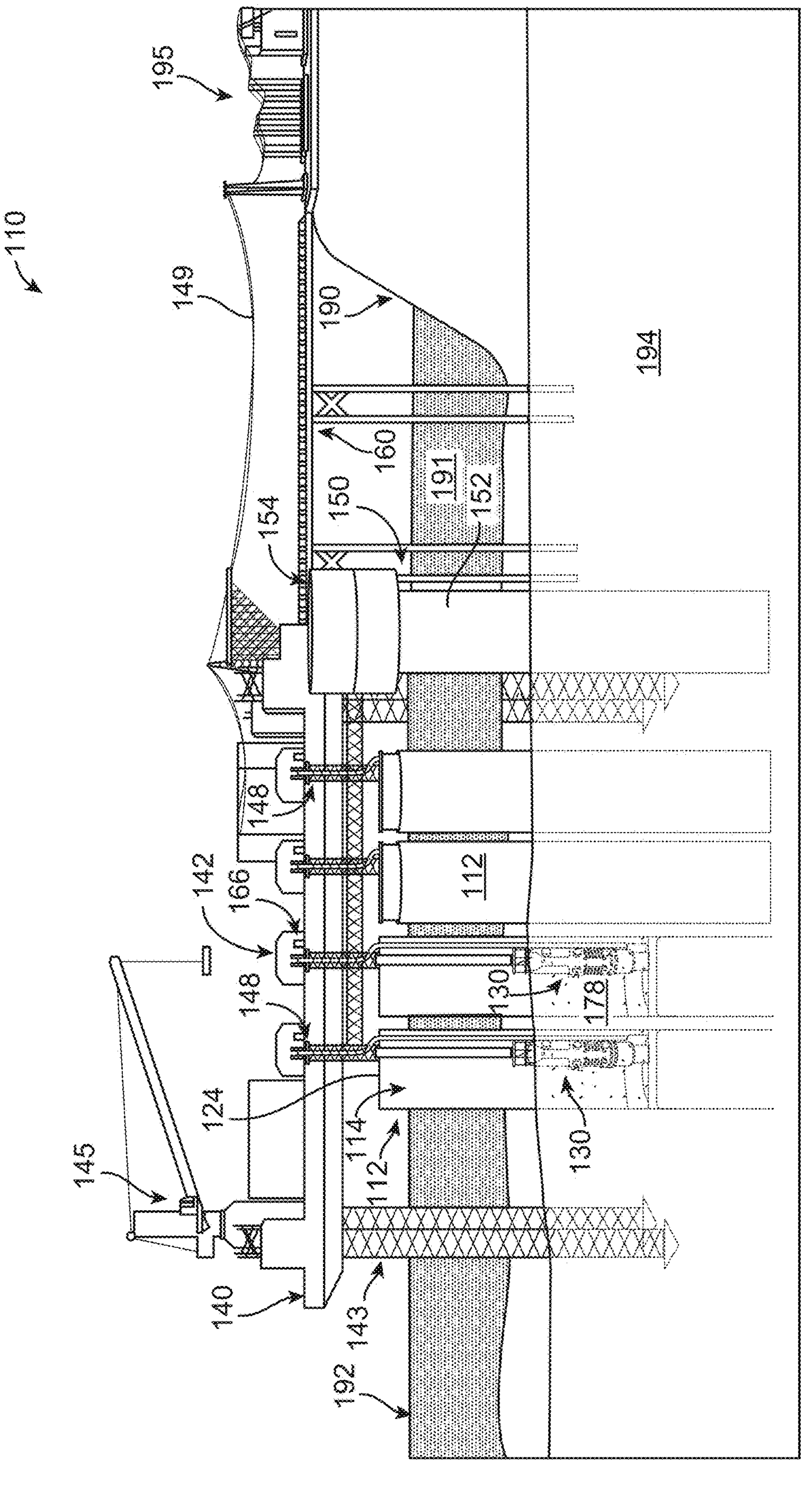
FIG. 1A is a diagram of an exemplary offshore power generation facility in accordance with an embodiment of the present disclosure.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

INTRODUCTION

The present disclosure provides for (among other things) components, facilities, and methods for producing reliable, affordable electrical power in an environmentally friendly manner. For example, the production of carbon-neutral power in an affordable manner is accomplished through the use of nuclear reactors. Additionally, the use of pre-certified modular reactors helps to eliminate many of the typical up-front costs and construction delays that have been experienced when constructing prior nuclear plants. Additionally, the use of modular reactors provides an easily scalable power source that may grow as necessary. The present disclosure also provides systems and methods for constructing nuclear power generation facilities in a modular manner that may lead to reduced construction costs and increased safety with regard to potential accidents, attacks, and natural disasters such as tidal waves, earthquakes, fires, etc. Embodiments of the disclosed offshore power generation facility are disposed in a body of water over an earthen bed and may include at least one monopile structure having a bottom end and a top end, wherein the bottom end of at least one monopile structure is disposed in the earthen bed and the top end extends above the surface of the body of water. Each monopile structure may include a cylindrical outer monopile and a cylindrical inner sleeve disposed within the outer monopile. A modular nuclear reactor is disposed within an interior volume of each monopile structure. Each reactor may be a light water moderated reactor that provides steam to an associated steam generator system for the production of electricity. Other potential reactor types include heavy water moderated reactors, molten salt reactors, lead or sodium cooled reactors, and high temperature gas reactors.

Yet other embodiments of the present disclosure provide methods of constructing the disclosed power generation facilities in which an outer monopile is driven into an earthen bed beneath a body of water. Earthen bed material is then removed from inside the outer monopile so that an inner sleeve can be disposed therein, followed by placement of a modular light water moderated nuclear reactor within the inner sleeve. While radioactive controlled systems are disposed within the monopile structure, the balance of plant systems such as feed water systems, power generation turbine, desalination systems, and the like may be maintained on an offshore platform adjacent the monopile structures. Reactor plant control personnel operate the nuclear reactors from a reactor plant control room on a seismically protected monopile or foundation adjacent the offshore platform. The balance of plant systems can be readily isolated from the corresponding nuclear reactors should the need arise.

As further described herein, in various aspects, the disclosure relates to systems and methods for generating electrical power. In some aspects, the systems and methods can make use of offshore monopiles that house respective nuclear containment vessels and reactors. For example, in these aspects, the monopiles can include double monopile assemblies, which can optionally be formed by first pile driving a foundation monopile, followed by inserting into the first monopile a sealed inner sleeve (for example, made of stainless steel or with a stainless steel inner diameter cladding) that houses the containment, reactor vessel, spent fuel pool, and pool within which refueling is conducted. As another example, a single monopile assembly (including only a single monopile) can include a carbon steel monopile that is pile driven, drilled out, and then inserted with a containment vessel. Although driven piles may be used, alternate embodiments include pile structures that need not be driven into the corresponding earthen bed.

In various aspects, the disclosed systems and methods can use the ocean (or other body of water) as an aircraft impact protection (instead of reinforced concrete).

In various aspects, the disclosed systems and methods provide a deconstructed format (e.g., having a separate offshore vessel/platform for the balance of plant, a separate offshore vessel/platform for the nuclear steam supply system, and a separate offshore vessel/platform for any seismic grade I or seismic grade II component (e.g. control room and radioactive waste storage)). The deconstructed format enables each vessel/platform to be manufactured in separate shipyards with different costs of labor, costs of steel, and quality assurance programs, ensuring cost-efficient and timely manufacturing appropriate to the equipment on each vessel/platform.

In various aspects, the disclosed systems and methods can permit disconnection of the balance of plant vessel for feedwater and steam so that the balance of plant vessel can be moved for various commercial, operational, or safety purposes (e.g. if a hurricane is approaching, if an offtaker stops paying, if a turbine failure cannot be quickly repaired on site).

Offshore Power Generation Facilities

Referring now to the figures, an offshore power generation facility 110 in accordance with an embodiment of the present disclosure is shown in FIG. 1A. The offshore power generation facility 110 includes an offshore nuclear power portion that provides electricity to an onshore power plant substation 195. As further disclosed herein, the offshore power generation facility 110 includes at least one modular nuclear reactor 130 disposed in a monopile structure 112 (also referred to as an integrated monopile system). A bottom portion of the monopile structure 112 is installed in earthen bed 194 (an example of an earthen substrate), a middle portion is in the body of water 191, and a top portion is above the surface of the body of water 191. The offshore power generation facility 110 may include a plurality of modular nuclear reactors 130, with each nuclear reactor 130 being disposed in an independent monopile structure 112. In some embodiments, an independent monopile structure 112 (e.g., each monopile structure 112) includes a single nuclear reactor (in other words, it does not include two or more nuclear reactors), while in other embodiments a monopile structure 112 may include two or more nuclear reactors (more generally, a monopile structure 112 may include two or more power generators of the same or different type). As shown, each monopile structure 112 is constructed in a body of water 191 adjacent the shoreline 190 on which the power plant substation 195 is disposed. Optionally, the offshore power generation facility 110 can be constructed close enough to the shoreline 190 of the body of water 191 so that a causeway 160 may be constructed that connects the offshore power generation facility 110 with the onshore power plant substation 195. However, in alternate embodiments, it is contemplated that the offshore power generation facility 110 may be disposed farther offshore than is practicable to be reached by a bridge or causeway and the substation 195 may be sited offshore.

As further described, a nuclear side (generating portion) of the offshore power generation facility 110 (for example, the nuclear reactors 130, primary coolant systems, spent fuel storage containers (labeled 180 in other Figures), and other components and systems directly involved in the generation of power) can be maintained within the plurality of monopile structures 112, whereas a balance of plant (BOP) portion (for example, the steam turbines 142, power lines 149, and other supporting components and auxiliary systems) of the electrical generation facility can be maintained on a separate offshore vessel 140. As such, the potential for the release of any contaminants to the environment from the nuclear process are reduced (e.g., minimized) in that each nuclear reactor 130 is maintained in its own individual monopile structure 112, with only secondary support system lines, such as steam lines (labeled 144 in other Figures), secondary fluid return lines (labeled 146 in other Figures), reactor control lines, etc., passing from each monopile structure 112 to the offshore vessel 140. Readily operated disconnects 148 may be provided in all lines that run between the monopile structures 112 and the balance of plant systems on the offshore vessel 140 to allow for rapid separation of the offshore vessel 140 from the nuclear reactors 130 should that become useful, desirable, or necessary.

Embodiments are not limited the context of an offshore power generation facility. One or more (e.g., all) components of the power generation facility 110 may be on land (e.g., far from a body of water or the shore). For example, a monopile structure (similar to 112) is installed in an earthen bed without a body of water over it (in this case, the monopile structure may be installed deeper in the earthen bed so the top of the structure is closer to the surface of the earthen bed). In another example, one or more (e.g., all) components of the separate offshore vessel 140, such as the balance of plant systems, are on land (e.g., skid mounted).

Furthermore, embodiments are not limited to power generation facilities with nuclear reactors. A nuclear reactor is an example of a power generator that can be in a monopile structure (e.g., of a power generation facility). Other example power generators that may be in a monopile structure include gas fired steam boiler, other gas fired generation, High Temperature Gas Reactor, Molten Salt Reactor, sodium cooled fast reactors, etc.

Figure 1B:
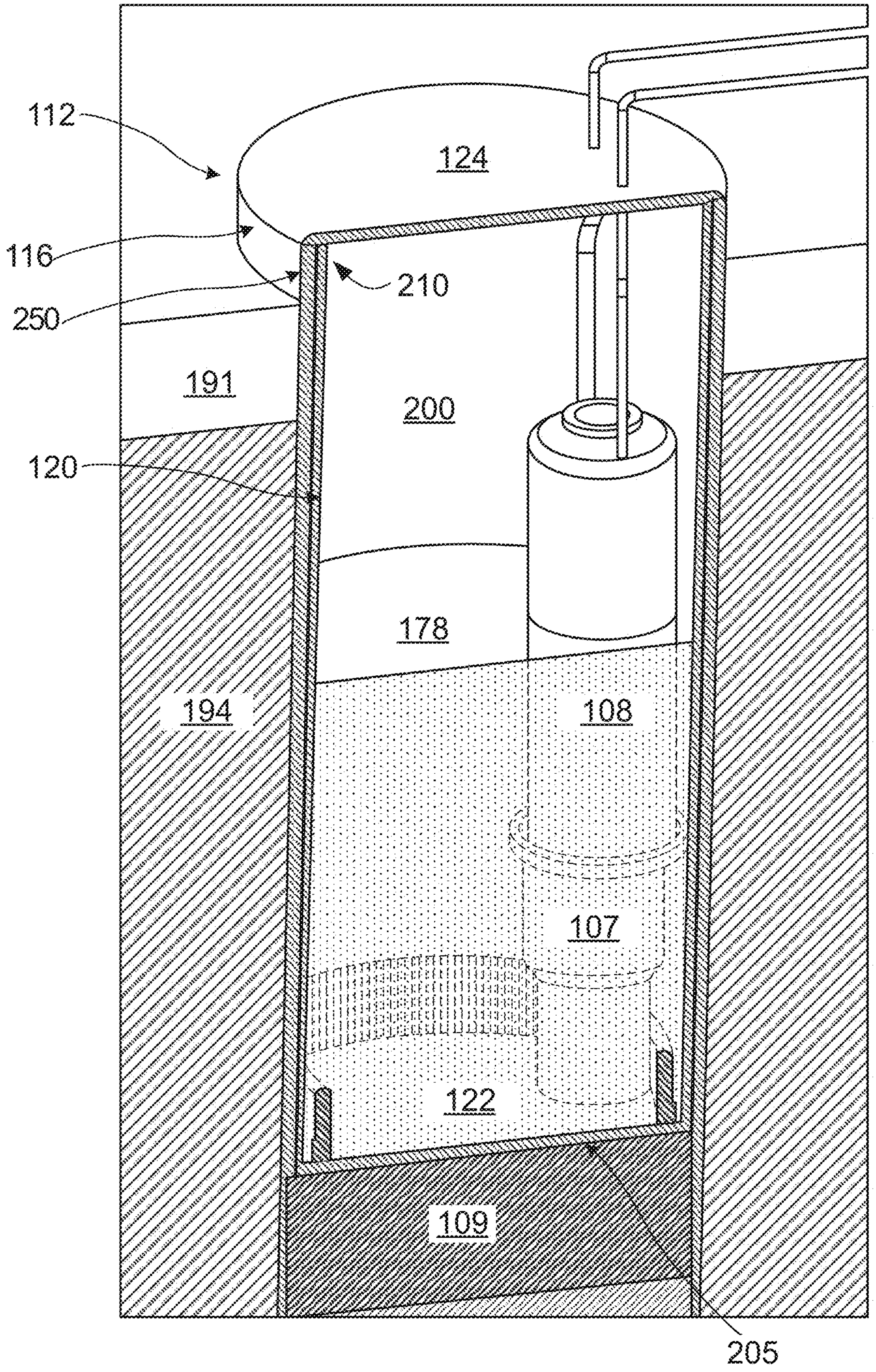
FIG. 1B is a cross-sectional diagram of an example monopile structure, accordance with an embodiment of the present disclosure.
Figure 1C:
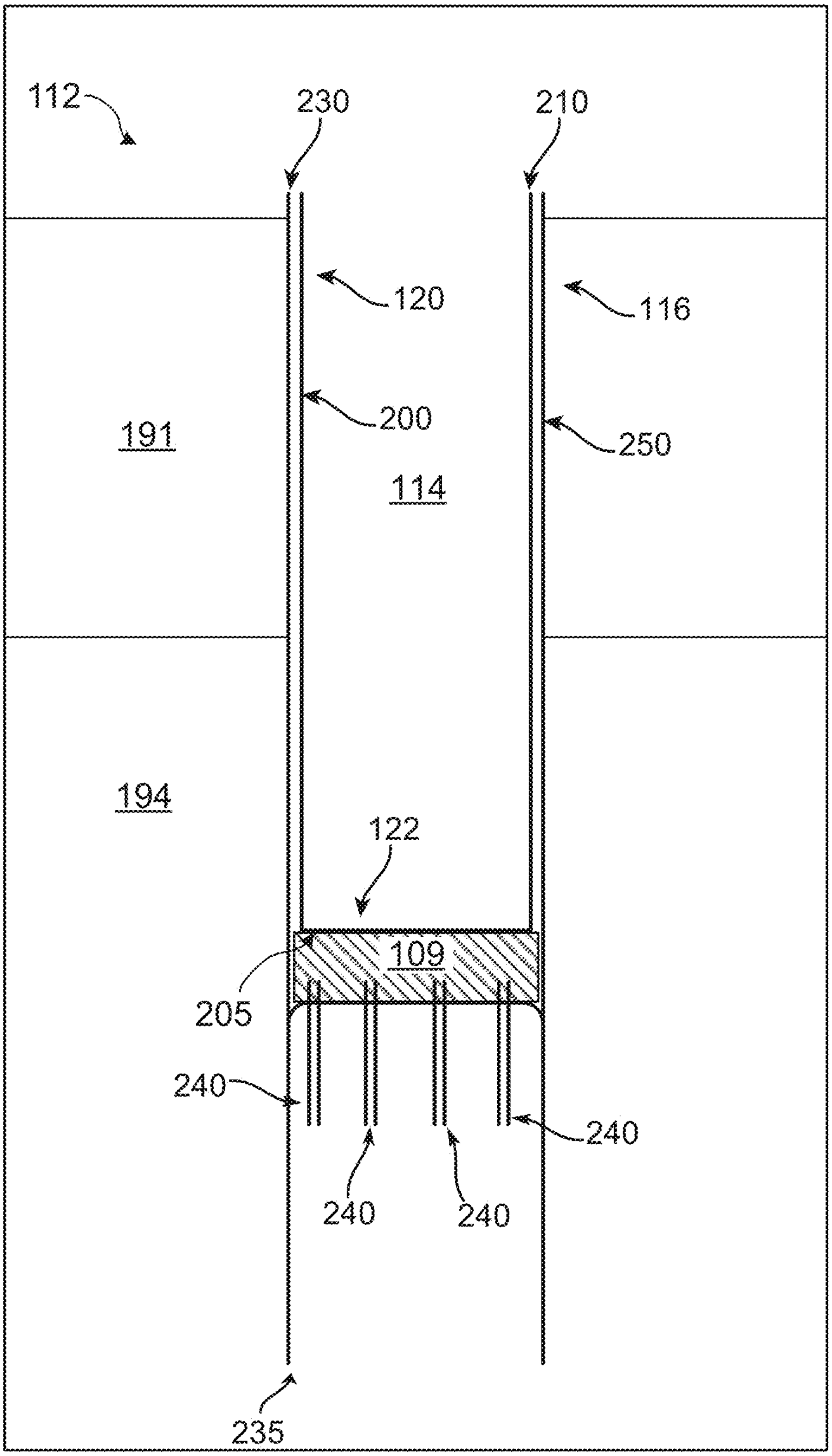
FIG. 1C is a cross-sectional diagram of another example monopile structure, accordance with an embodiment of the present disclosure.

FIGS. 1B and 1C are cross-sectional diagrams of monopile structures 112, in accordance with some embodiments of the present disclosure. A monopile structure 112 includes an inner sleeve 120 nested inside an outer monopile 116. The outer monopile 116 includes a cavity (labeled 115 in other Figures) with an open top end 230 and an open bottom end 235 (e.g., formed by one or more side walls 250). The inner sleeve 120 includes a cavity 114 with an open top end 210 and a closed bottom end 205 (see also floor 122). Example dimensions of the outer monopile 116 and inner sleeve 120 are provided in FIG. 19.

Referring back to FIGS. 1B and 1C, the one or more side walls 200 and the closed bottom end 205 of the inner sleeve 120 may be watertight and/or air tight. Thus, air or water (e.g., borated water) in the cavity 114 may be isolated from air or water (e.g., the body of water 191) outside of the inner sleeve 120 (e.g., after a lid 124 is installed on the top end 210 of the inner sleeve). The outer monopile 116 may or may not be watertight. Either way, due to the open bottom end 235, water from the body of water 191 may be inside the cavity 115 of the outer monopile 116, even when the inner sleeve 120 is installed in the outer monopile 116.

In the example of FIGS. 1B and 1C, both the inner sleeve and outer monopile are cylindrical. Among other advantages, the cylindrical shape may help the monopile structure 112 withstand large hydrostatic pressures in the body of water 191 or in the earthen bed 194. Additionally, if the outer monopile 116 is cylindrical, this may enable it to be driven (e.g., via a pile-driver) into the earthen bed 194 using standard offshore wind power processes and equipment. Note that each structure is not required to be perfectly cylindrical. For example, the radius may change along the length of the structure or at a given length. In another example, welds, bolts, or pipes may protrude from a side of a structure. Furthermore, other shapes are also possible, such as a rectangle, octagon, hexagon, etc. The inner sleeve 120 may have the same or similar shape as the outer monopile 116 to increase the size of the cavity in the monopile structure 112 (and thus increase the size and number of components that can be housed in the monopile structure 112).

In the example of FIG. 1B, the monopile structure 112 includes a nuclear reactor contained in a (e.g., steel) containment vessel. More specifically, the nuclear reactor is contained in a top containment vessel 108 (also "upper containment vessel" and a bottom containment vessel 107 (also "lower containment vessel"). As illustrated, the nuclear reactor is not necessarily centered in the cavity of the inner sleeve 120 to provide additional space for other components, such as de-tensioning equipment (e.g., a containment flange tool and a reactor flange tool), one or more new fuel storage containers, one or more spent fuel storage containers, or any combination thereof. However, in other embodiments, the nuclear reactor may be centered in the cavity of the inner sleeve 120.

In the example of FIG. 1B, the steam and water lines pass through the lid of the monopile structure 112, which eliminates connections passing through the inner sleeve 120 and outer monopile 116. Connections between both may present vulnerabilities due to loads concentrating at these points during seismic events. However, this is not required. In other embodiments, one or more lines may pass through a side of the monopile structure 112. Among other advantages, this may enable a refueling module 170 to be coupled to the monopile structure 112 during a refueling process prior to disconnecting the steam and water lines, which may enable the reactor to continue producing power while the refueling module 170 is being coupled to the monopile structure 112.

In embodiments where the monopile structure 112 houses a nuclear reactor (instead of another type of power generator), the monopile structure 112 may include radiation shielding from the nuclear reactor and fuel in the inner sleeve 120. For example, the monopile structure 112 includes borated water that provides at least twenty feet of vertical shielding above the spent fuel (e.g., in a spent fuel storage container). Vertical shielding below the reactor core and fuel may be provided by the earthen substrate below the inner sleeve 120. In some embodiments, the monopile structure 112 additionally includes a pad 109 below the inner sleeve 120 that provides additional shielding (e.g., a pad of concrete several feet thick). Horizontal shielding from the reactor core and fuel may be provided by the inner sleeve 120 and outer monopile 116, which may each be about fifteen centimeters thick. If the reactor core and fuel are below the earthen bed, then the earth provides additional horizontal shielding. In some embodiments, one or more portions of the monopile structure 112 are surrounded by concrete (or another shielding material) to provide additional horizontal shielding from the reactor core and fuel (e.g., one meter of concrete). For example, if the reactor core and fuel are at the bottom of the inner sleeve 120, then the bottom base of the monopile structure 112 may be surrounded by concrete.

Although a monopile structure 112 may include multiple power generators, it may be advantageous for a monopile structure 112 to have only one power generator. Firstly, due to space constraints, it may be difficult to install, maintain, and operate multiple power generators in a single monopile structure 112. Secondly, a single power generator eliminates concerns of a generator falling over and damaging another generator (e.g., during a process where a generator is being moved or refueled).

Although a monopile structure 112 can have many different sizes and dimensions, it may be advantageous for a width (e.g., diameter) of the cavity of the inner sleeve 120 to be less than the height of the power generator. Thus, if the power generator falls over (e.g., during refueling), the power generator cannot become horizontal. Among other advantages, this may reduce the terminal speed of the falling generator, which reduces the likelihood of the generator damaging itself or other components in the inner sleeve 120. Additionally, a fallen non-horizontal power generator (e.g., tilted by twenty to thirty degrees) may be easier to recover and repair compared to a fallen horizontal power generator. Furthermore, a horizontal nuclear generator may create a safety hazard, cause operational issues, lose natural circulation, lose passive heat removal capability, or ruin the reactor. Additionally, due to the increased safety of a cavity with a smaller width, the power generator may be configured to produce more power, since power output may be limited by possible safety events. Although the above description is in the context of the full height of a power generator, it is also applicable to a portion of the generator that is susceptible to falling over. For example, the width of the cavity is less than the height of a top containment vessel (e.g., top containment vessel 108) of a nuclear reactor since the top containment vessel may be susceptible to falling over during refueling. More generally, a width of the inner sleeve 120 at, near, or around the power generator may be less than 100%, 90%, 80%, 70%, 60%, or 50% of the height of the power generator.

Monopile structures 112 described herein are not limited to two layers (the outer monopile 116 and inner sleeve 120). A monopile structure 112 may have additional or fewer layers.

Installing Monopile Structures

Figure 2A:
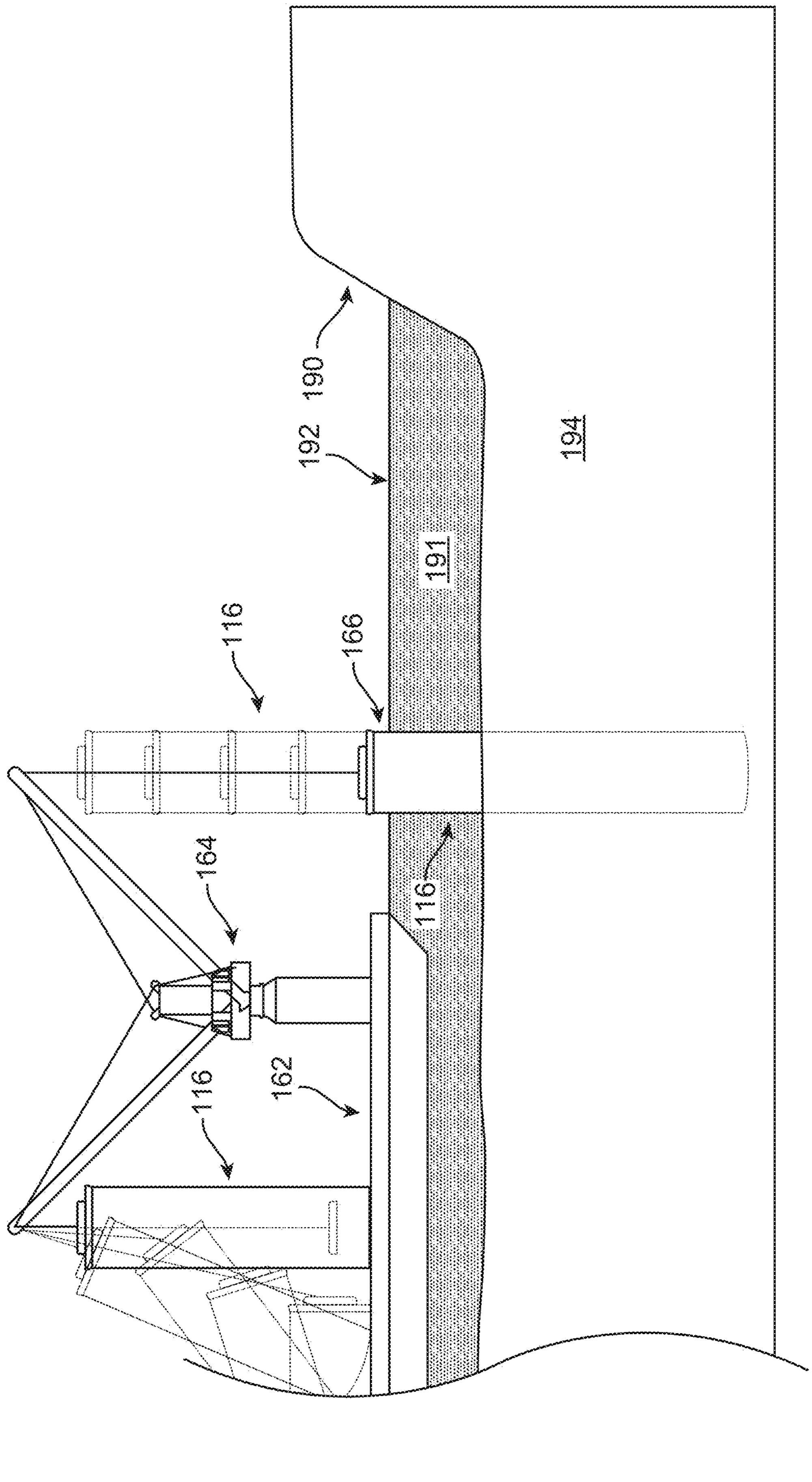
FIGS. 2A through 2G are diagrams of the construction of a monopile structure of the offshore power generation facility shown in FIG. 1A.
Figure 8A:
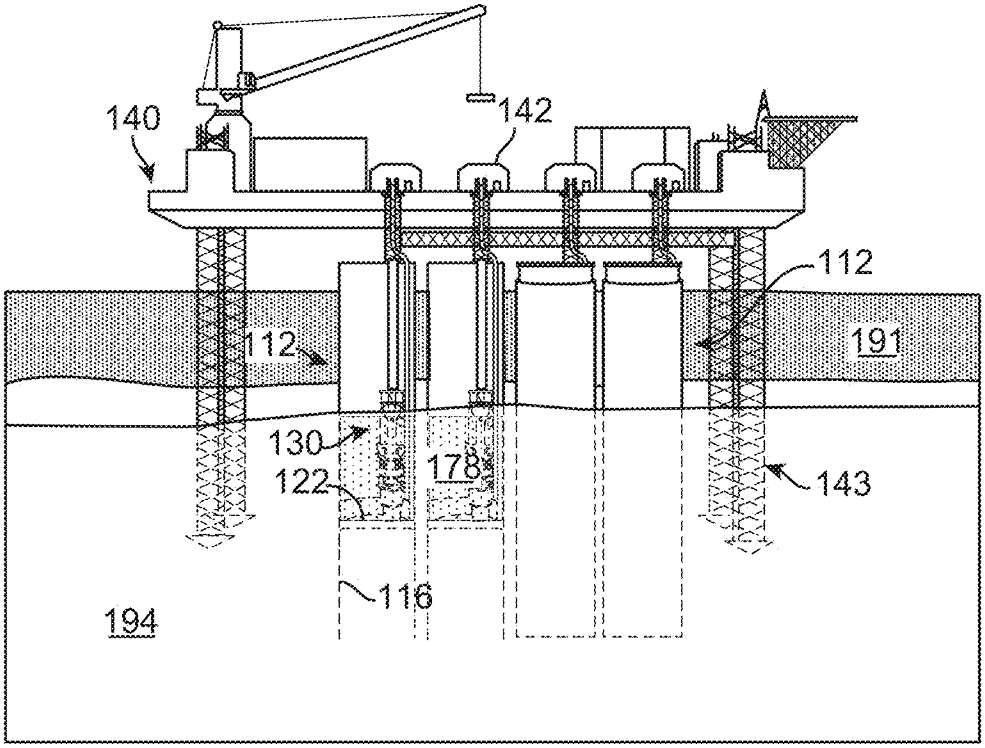
FIGS. 8A and 8B are diagrams of the monopile structures of the offshore power generation facility shown in FIG. 1A.
Figure 8B:
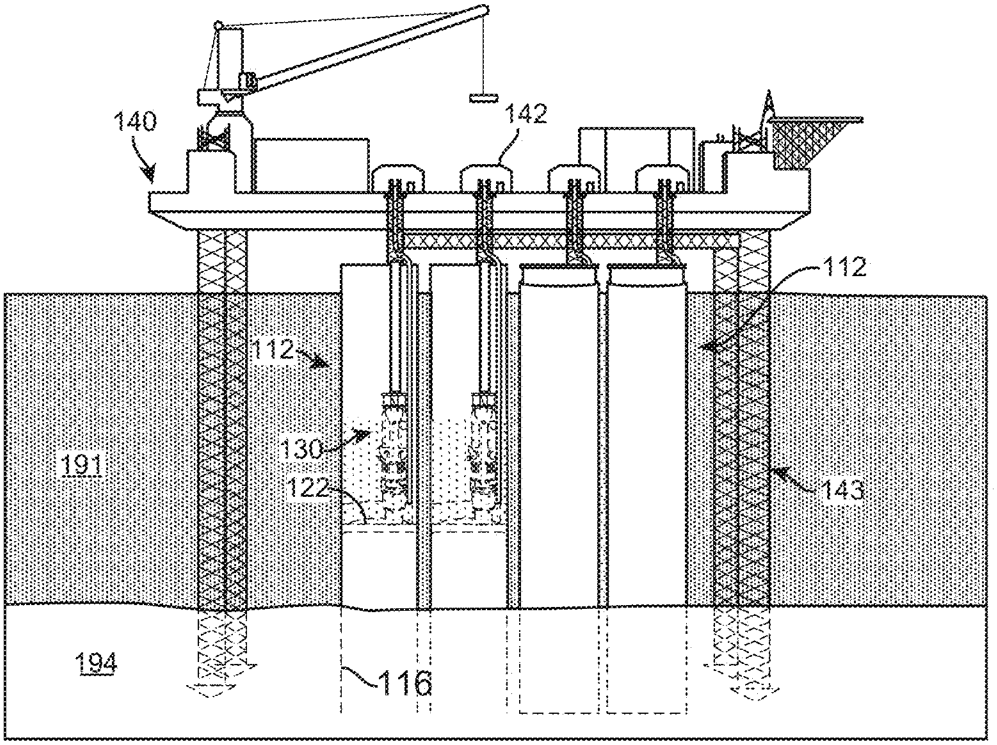

Referring now to FIGS. 2A through 2E, the construction of each monopile structure 112 is discussed. As shown in FIG. 2A, when constructing a monopile structure 112, a bottom end of an outer monopile 116 is first driven into the earthen bed 194 below the body of water 191. As previously discussed, the outer monopile 116 is cylindrical in shape and defines a throughbore. Referring to FIGS. 8A and 8B, the bottom end of the outer monopile 116 may be driven (e.g., between 20 to 50 meters) under the surface of the earthen bed 194 so that a top end of the outer monopile 116 extends above the top surface 192 of the body of water.

Figure 12:
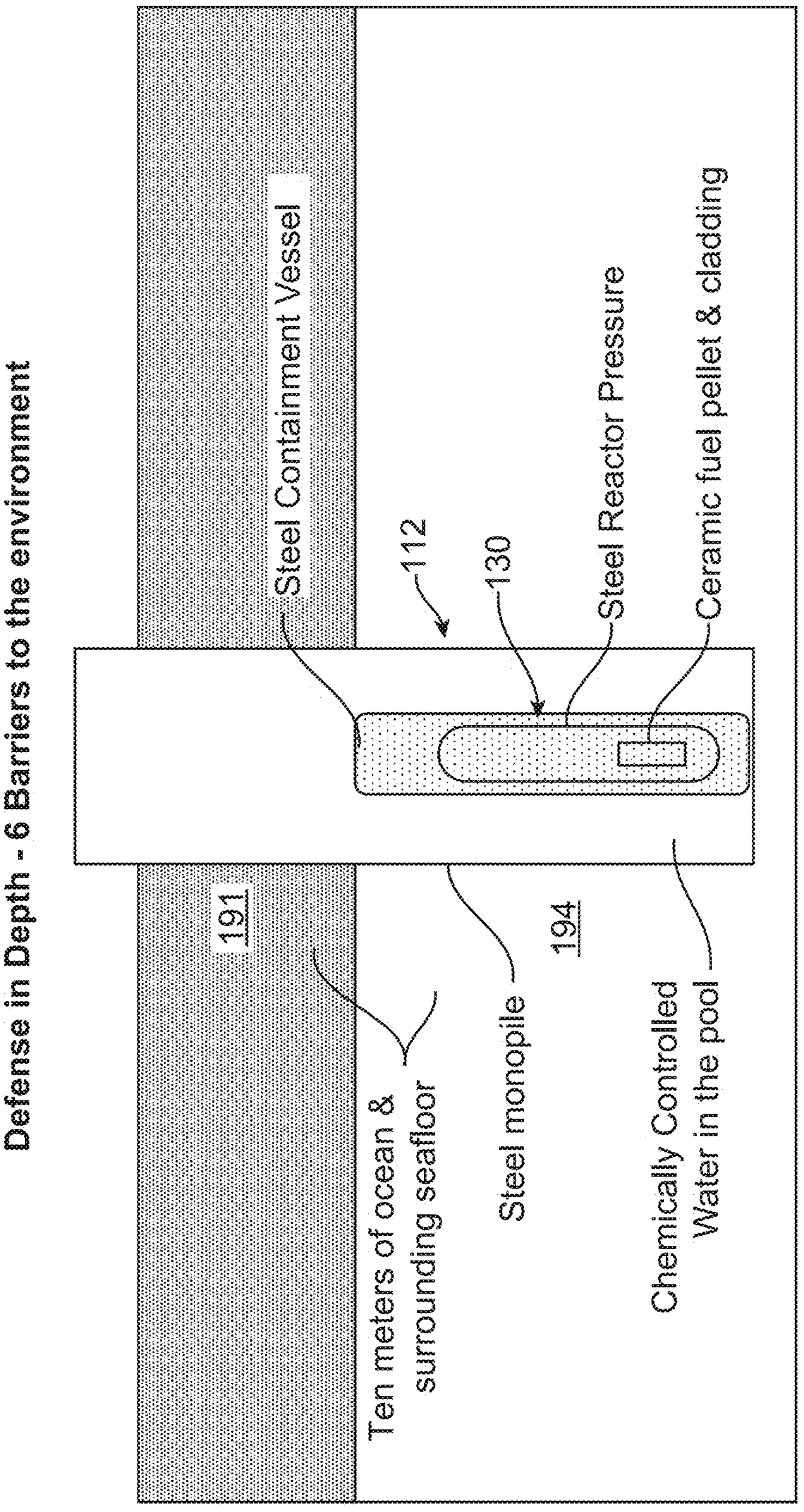
FIG. 12 is a diagram of various barriers separating a reactor core of the offshore power generation facility from the environment.

The depth of the nuclear reactor 130 relative to the surface of the earthen bed varies such that it may be entirely above the earthen bed, entirely below, or some combination thereof. As shown in FIG. 8A, the monopile structure 112 ensures that both the nuclear core 131 of the nuclear reactor 130 and the spent fuel storage container 180 are both below the surface of the bed of earthen material 194. Additionally, the surrounding body of water 191 provides protection against possible attack (e.g. aircraft impact, paramilitary squad) as well as an infinite passive heat sink, for example, in case of a beyond design basis accident. FIG. 12 shows various layers to position between the reactor core 131 and the environment should a nuclear accident occur within a monopile structure 112. Referring to FIG. 8B, not all embodiments include the nuclear cores 131 being disposed below the surface of the earthen bed material 194. For example, the inner sleeve 120 is at the same depth relative to the surface 192 of the body of water 191, independent of the depth of the body of water 191. This allows for a consistent safety case of a minimum amount of water and/or earth protecting the nuclear reactor 130, a mass manufactured inner sleeve 120, and a consistent set of operational processes, such as refueling, all while allowing the placement of the power generation facility in different sites with different water depths.

The top end of the outer monopile 116 may extend at least 2 to 6 meters above the top surface 192 of the body of water 191, although this distance may vary depending upon the magnitude of the tides and the maximum flood height at the selected location. The distance may also depend on the size and structure of the lid. The outer monopile 116 may be driven (e.g., via a pile-driver) into the earthen bed 194 using standard offshore wind power processes and equipment, such as those used when constructing offshore wind power structures. In another example, outer monopile 116 may be inserted in earthen bed 194 by a vibration technique (that vibrates outer monopile 116), by use of a diaphragm wall, or by a vertical shaft boring technique.

Figure 2B:
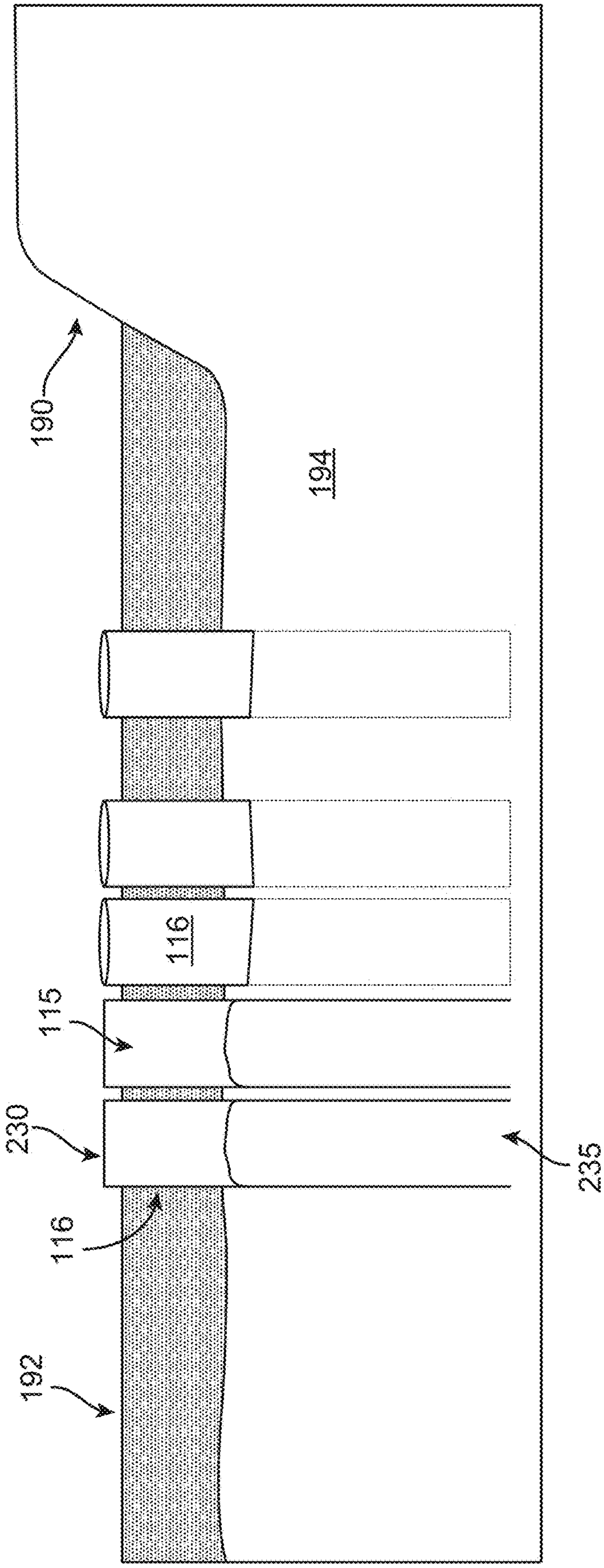
Figure 2C:
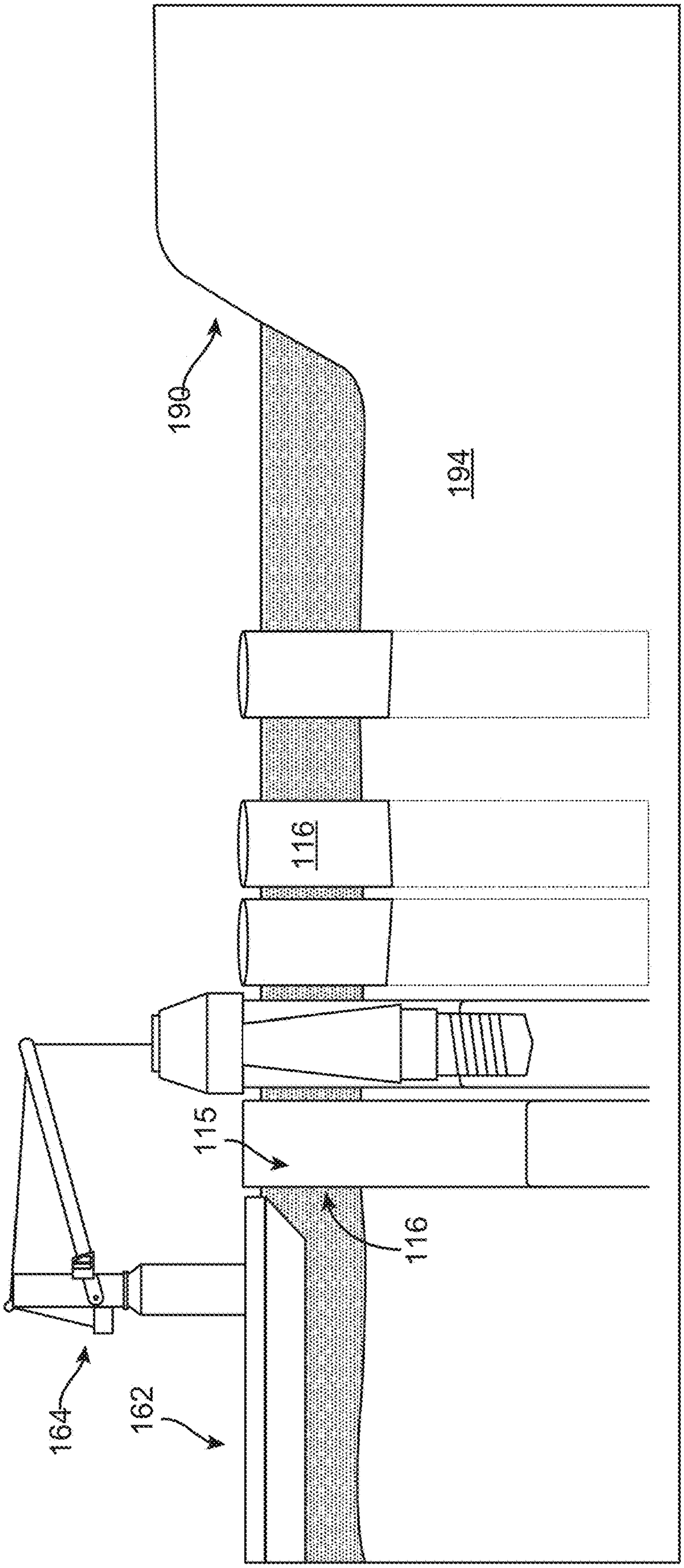
Figure 2D:
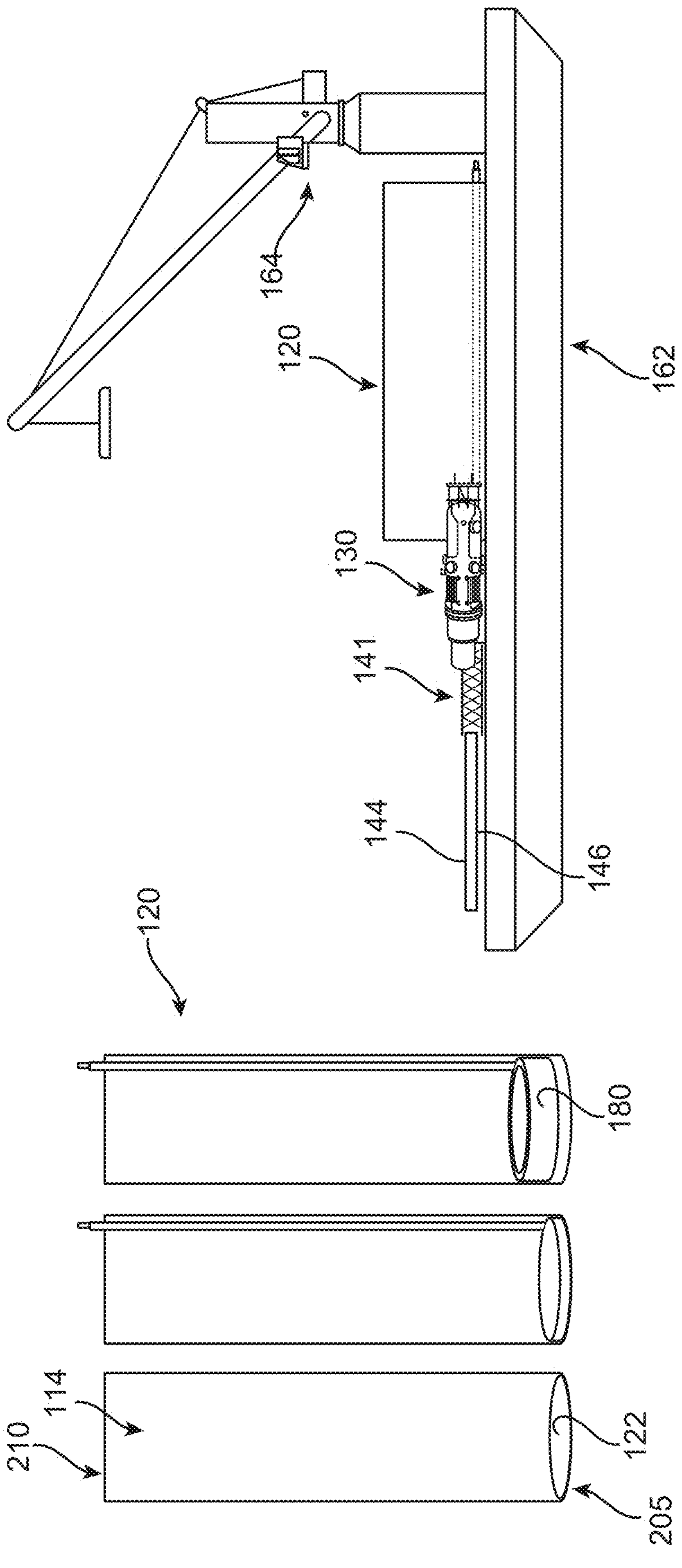

As shown in FIG. 2B, each outer monopile 116 includes an interior volume 115 that is at least partially filled with earthen material after being inserted into the earthen bed 194 (it may also be filled with water from the body of water). As shown in FIG. 2C, in order to prepare the outer monopile 116 for installation of the inner sleeve 120, earthen material is removed from the interior volume 115 of each outer monopile 116 (through the open top end), such as by drilling. This step may be used for those instances in which the inner sleeve 120 will be disposed at least partially below the surface of the earthen bed 194 (e.g., see FIG. 8A). Also, as shown in FIG. 2C, the entire interior volume 115 of each outer monopile 116 is not voided of earthen material. The amount of earthen material that is removed from each outer monopile 116 need only be enough to allow for each inner sleeve 120 to be inserted therein so that the top end of each inner sleeve 120 is substantially flush with, or extends slightly beyond, the top end of each outer monopile 116. As shown in FIG. 8B, for those embodiments in which the nuclear reactor 130 is surrounded only by water, no earthen material need be removed from the outer monopile 116.

Referring back to FIGS. 2D and 2E, the inner sleeves 120 may be pre-assembled onshore or in a dry dock. In some embodiments, all of the items and systems used to operate the nuclear reactor 130 including the nuclear reactor itself, with the exception of (e.g., borated) water 178 (when applicable), are included within each inner sleeve 120 prior to arrival on site (however this is not required. In other embodiments one or more items may be installed in the inner sleeve after the inner sleeve is installed in the outer monopile). For example, each inner sleeve 120 includes the necessary instrumentation, spent fuel storage containers 180, and other auxiliary systems for reactor operation. Once constructed, the pre-assembled inner sleeves 120 are transferred to the site of the offshore power generation facility 110 (for example, on a barge 162 having a crane 164) for insertion into the corresponding outer monopile 116. Each inner sleeve 120 is cylindrical and includes an open top end and a closed bottom end comprising a floor 122.

Figure 2E:
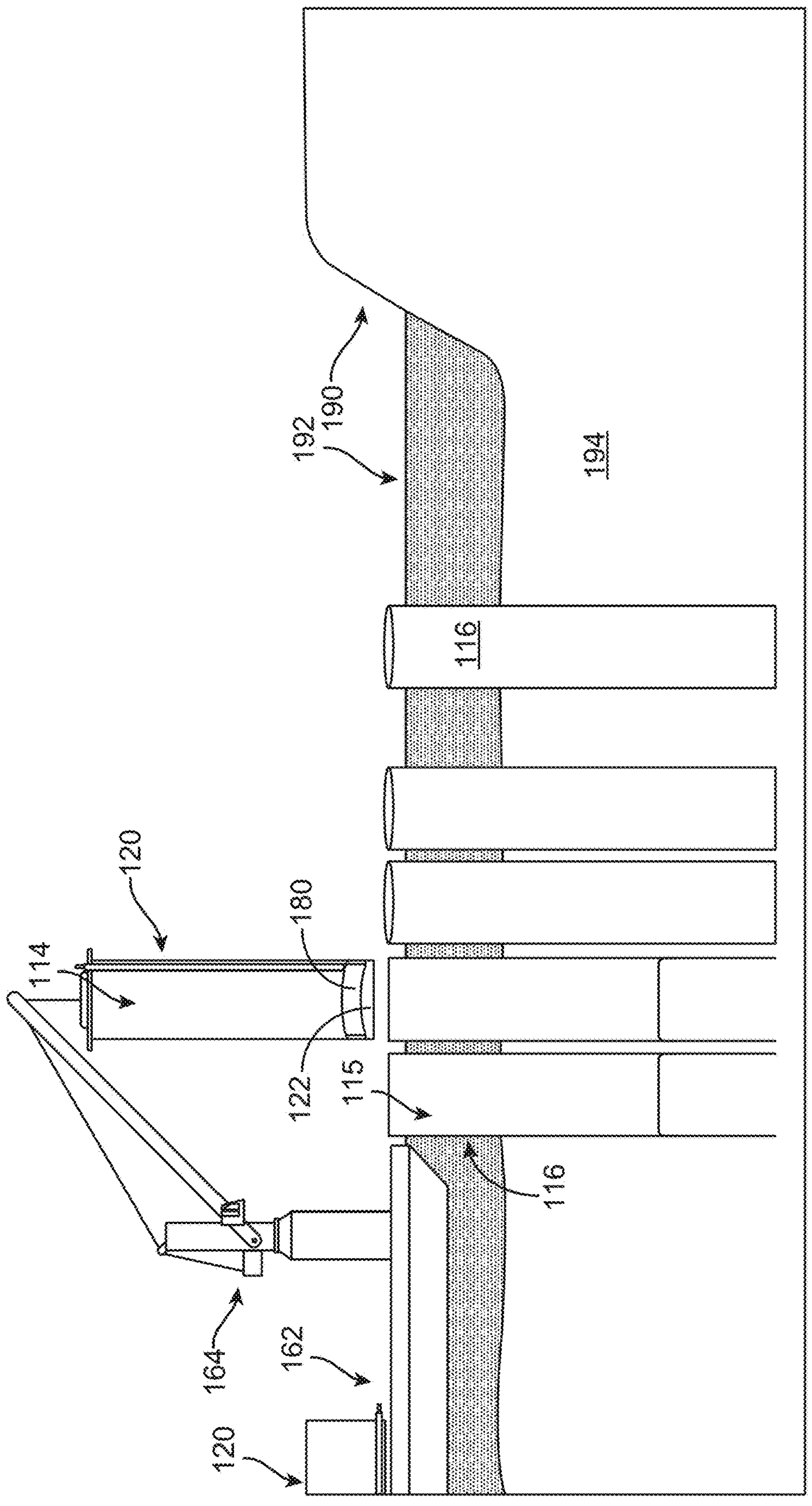

As shown in FIG. 2E, each inner sleeve 120 is lowered into the interior volume 115 of a corresponding outer monopile 116 (e.g., until the floor 122 of the inner sleeve 120 comes to rest on the earthen material that remains inside the outer monopile 116 (e.g., see FIG. 3)) or a concrete (or other material) base installed (e.g., poured) inside the outer monopile 116. Prior to insertion, an inner sleeve 120 may be placed over an outer monopile 116 via a crane on a barge (as illustrated in FIG. 2E) or float over (since the inner sleeve 120 may be watertight and buoyant). Lowering of the inner sleeve 120 may be performed using a different technique than insertion of the outer monopile 116, which may be inserted violently via pile driving. Since inner sleeve 120 houses important equipment (e.g., it may be a structure that maintains nuclear integrity) and since it may withstand strong hydrostatic forces, the inner sleeve 120 may be installed slowly and/or gently compared to the outer monopile 116 (e.g., the inner sleeve 120 is not pile driven).

Figure 2G:
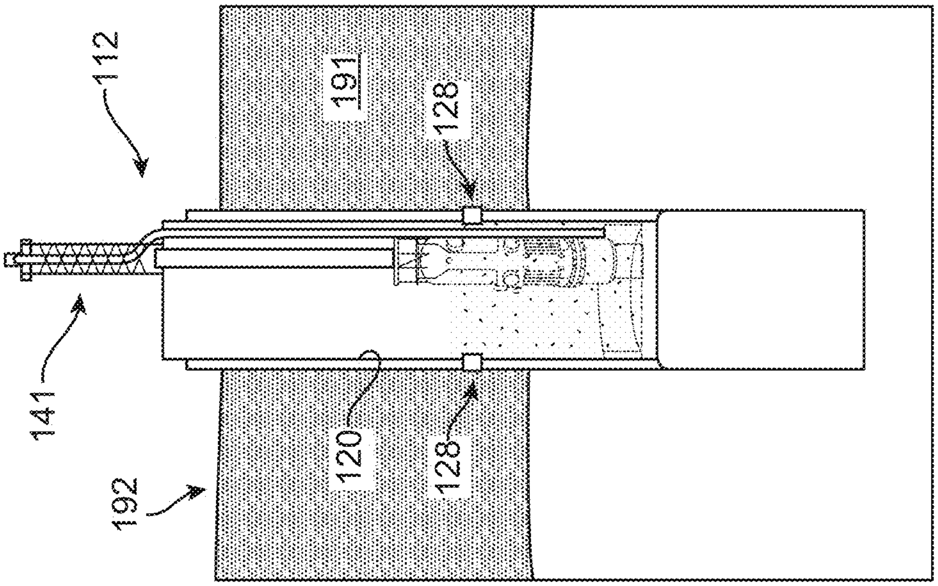
Figure 2F:
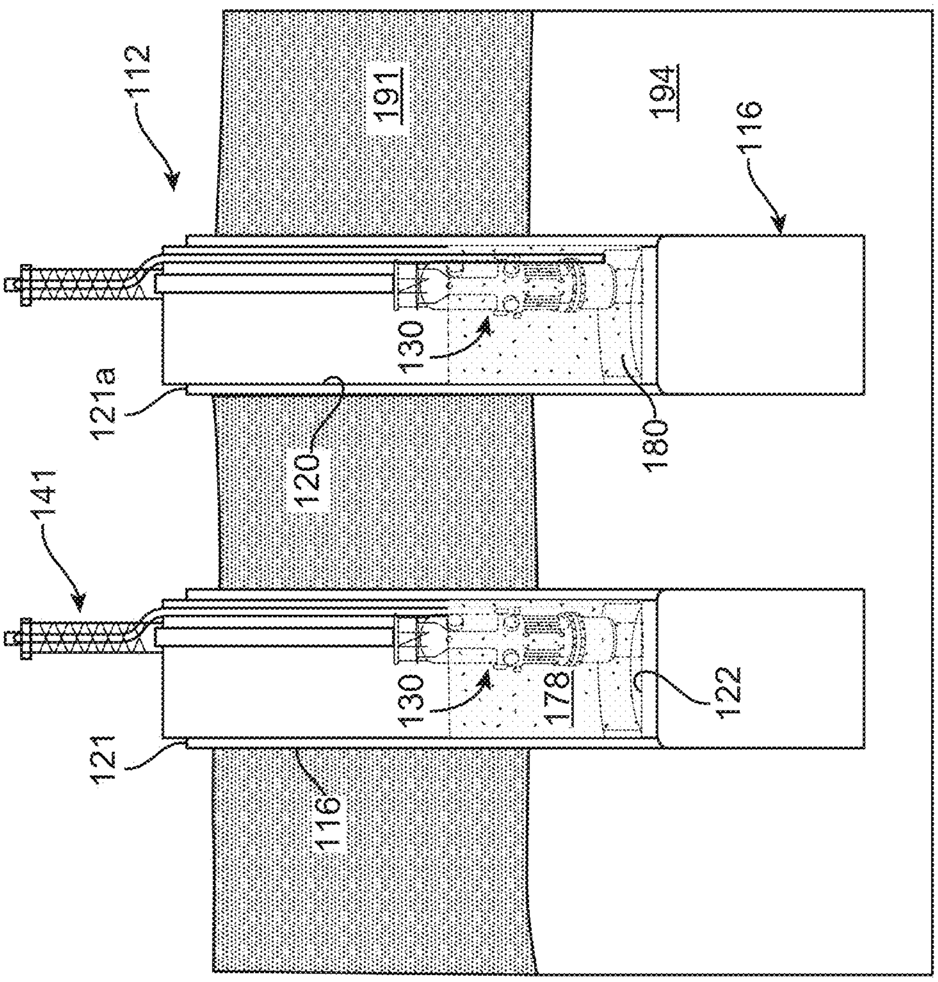

In situations where water in the outer monopile 116 and the inner sleeve 120 is watertight, inserting the inner sleeve 120 into the interior volume may include ballasting the inner sleeve 120. For example, the inner sleeve 120 is filled with heavy material (e.g., water). The weight of material may be adjusted until the inner sleeve 120 is at the desired depth. In some cases, water in the outer monopile 116 is pumped out of the outer monopile 116 as the inner sleeve 120 is lowered (e.g., to prevent water from overflowing out of the top end of the outer monopile 116. After insertion, the inner sleeve 120 may be coupled to the outer monopile 116 (e.g., with grout or a shock absorbing material). After insertion, an annular void is defined between the cylindrical side walls of the outer monopile 116 and the inner sleeve 120. The annular void can be filled with a grouting material 121 or a shock absorbing material 121*a* that helps secure the inner sleeve 120 in position inside the outer monopile 116 (see e.g., FIG. 2F). The grouting material 121 or shock absorbing material may additionally, or alternatively, help provide lateral seismic isolation.

The outer monopile 116 may be constructed of carbon steel. The inner sleeve 120 may be constructed of stainless steel for compatibility with the borated water 178 (e.g., to reduce or prevent corrosion from the borated water). However, in some embodiments, the inner sleeve 120 may have a cylindrical body portion that is formed by a different material (e.g., carbon steel) and covered (e.g., lined) by an inner cladding layer of stainless steel or other lining material such as epoxy.

As previously described with respect to FIG. 1B, a monopile structure 112 may include a pad (also "base") in the outer monopile 116 and below the inner sleeve 120 (e.g., see pad 109 in FIG. 1B). The bottom end 205 of the inner sleeve 120 may be coupled to (e.g., bolted to) the pad 109. The pad 109 may help support the vertical load of the inner sleeve (and the components housed inside), for example, if the native soil cannot support the load of the inner sleeve 120. The pad 109 may additionally or alternatively help reduce vertical seismic movement of the inner sleeve 120. The pad 109 may be easily fabricated and strong enough to support the weight of the inner sleeve 120 (and the components housed inside). For example, the pad 109 is made of concrete or steel (e.g., a 300 cm thick carbon steel pad). After the outer monopile 116 is installed in the earthen bed 194 and portions of the earth are removed from within the outer monopile, the pad 109 may be installed on the remaining earthen material in the cavity 115 of the outer monopile. Referring to FIG. 1C, to further increase stability, a pad 109 may be coupled to one or more micropiles 240 installed in the remaining earthen material in the cavity 115 of the outer monopile 116 (each micropile 240 may have open top and bottom ends). A micropile 240 may have a cylindrical shape and be less than 300 mm in diameter. A micropile 240 may be accompanied by light steel reinforcement grouting of cement slurry. Bottom ends of the micropiles may be inserted into the earthen bed such that top ends are extending from the bed (e.g., a few meters long). Then, the pad 109 is installed (e.g., concrete is poured) such that the top ends are coupled to the pad (e.g., contained in the pad). The depth of the micropiles 240 in the earthen bed may depend on the material of the earthen bed and the desired seismic stability.

In some embodiments, the outer monopile is a commercially manufactured monopile that meets ASME NQA-1 (Nuclear Quality Assurance-1) standards and/or considered safety critical by the nuclear regulator. For example, the outer monopile is commercially dedicated or has received an ASME "N Stamp" certification. In some embodiments, the nuclear regulator does not consider the outer monopile or inner sleeve to be safety-critical because of its positioning within and below a large body of water that would flood the outside of the reactor containment if either the monopile or inner sleeve structurally failed.

Power Generators

Figure 3:
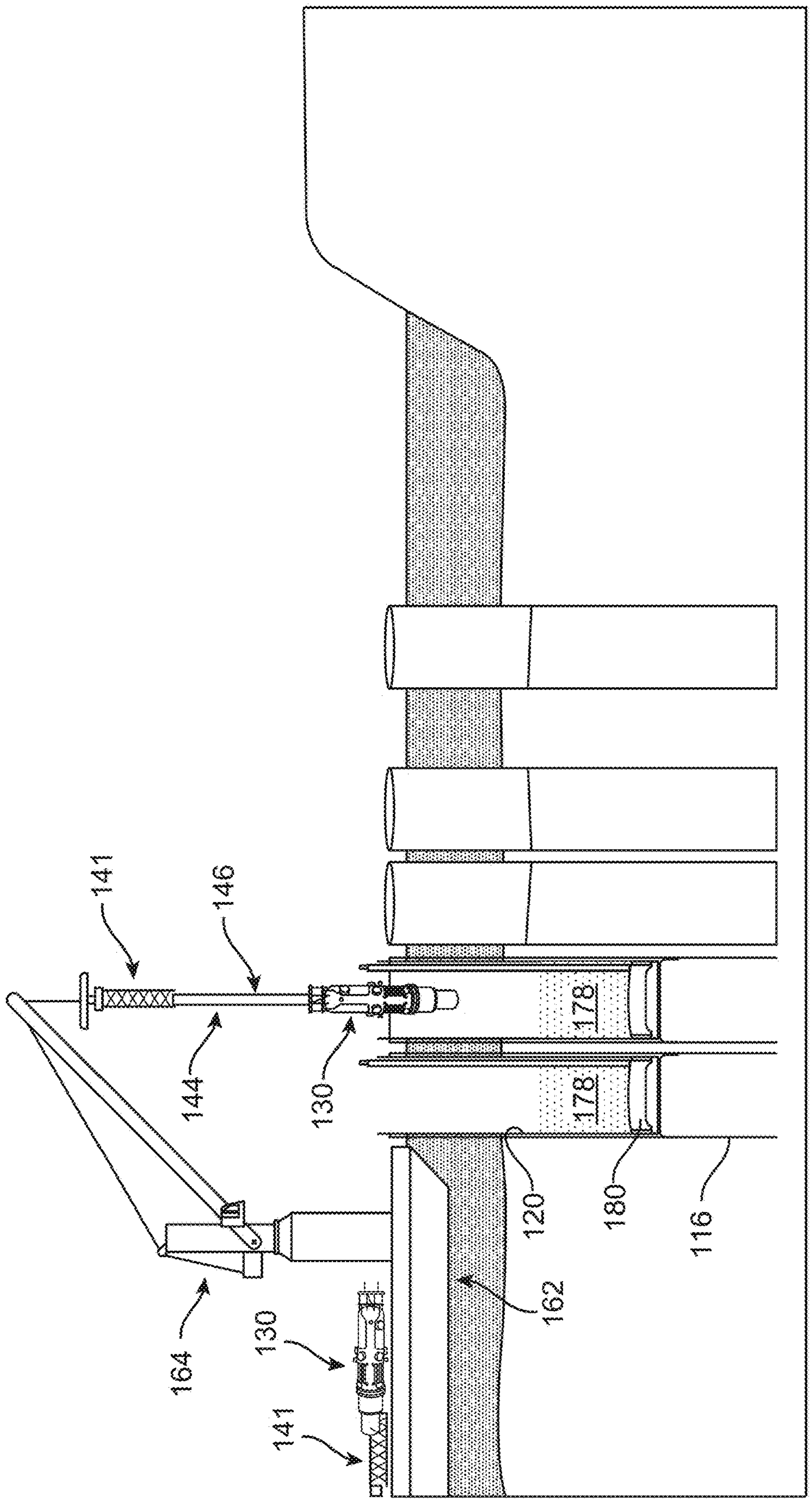
FIG. 3 is a diagram of the installation of the nuclear reactor in a monopile structure of the offshore power generation facility shown in FIG. 1A.

As shown in FIG. 3, after the monopile structures 112 are complete, the interior volume 114 (also "cavity") of each monopile structure 112 may be partially filled with a pool 178 of control pure water or chemically controlled (e.g., borated) water. Next, each nuclear reactor 130, along with the associated connecting lines (such as the steam lines 144 and the secondary fluid return lines 146) for connecting the nuclear reactor 130 to the balance of plant systems, is lowered into the interior volume 114 of the corresponding monopile structure 112. However, in some embodiments, a power generator (and other associated components such as water) may be installed in the inner sleeve 120 before it is inserted into outer monopile 116. Among other considerations, this may depend on how the inner sleeve 120 is installed.

Figure 13B:
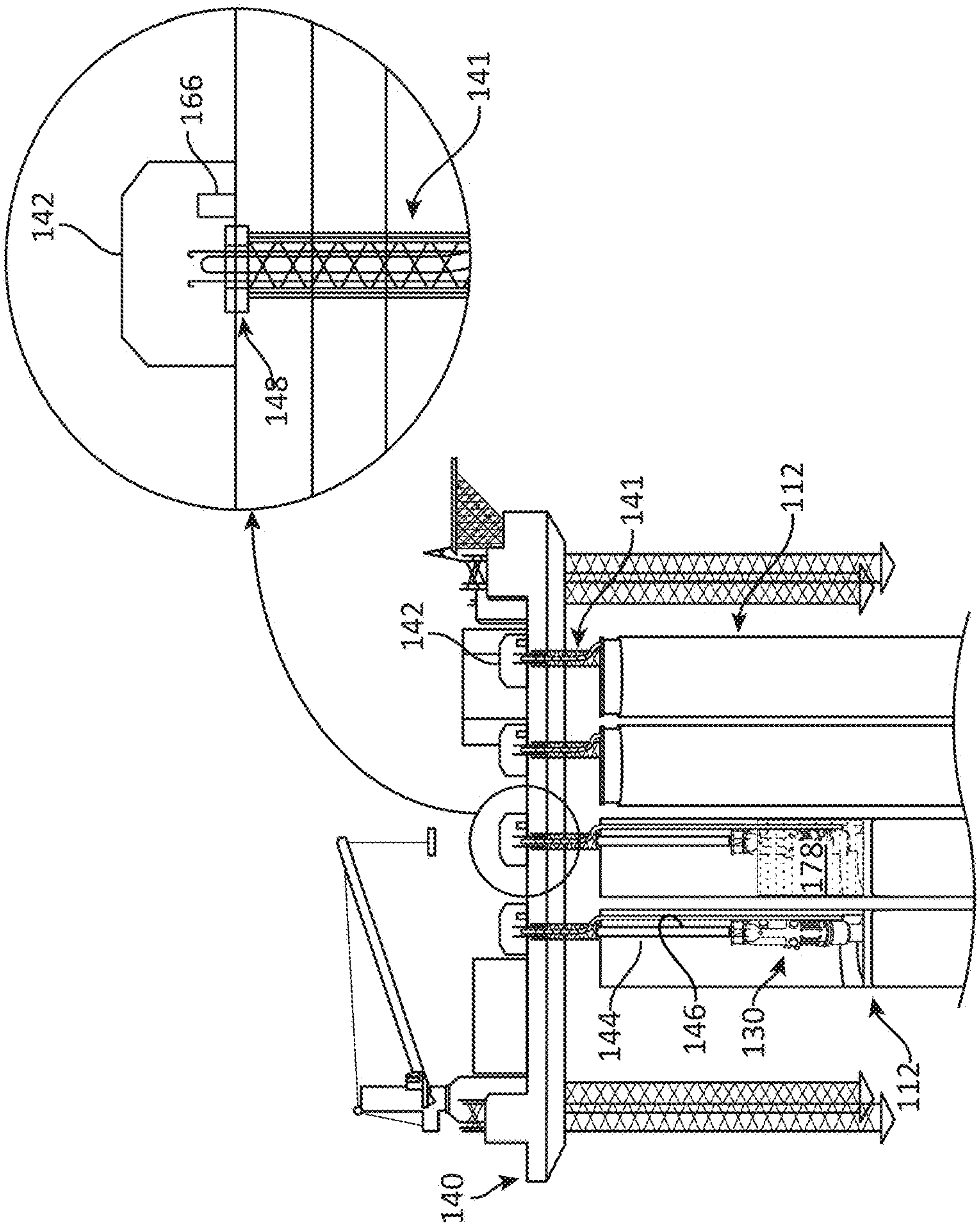
FIGS. 13A and 13B are diagrams of steam and water line connections that run from the nuclear reactors to the balance of plant systems.
Figure 13A:
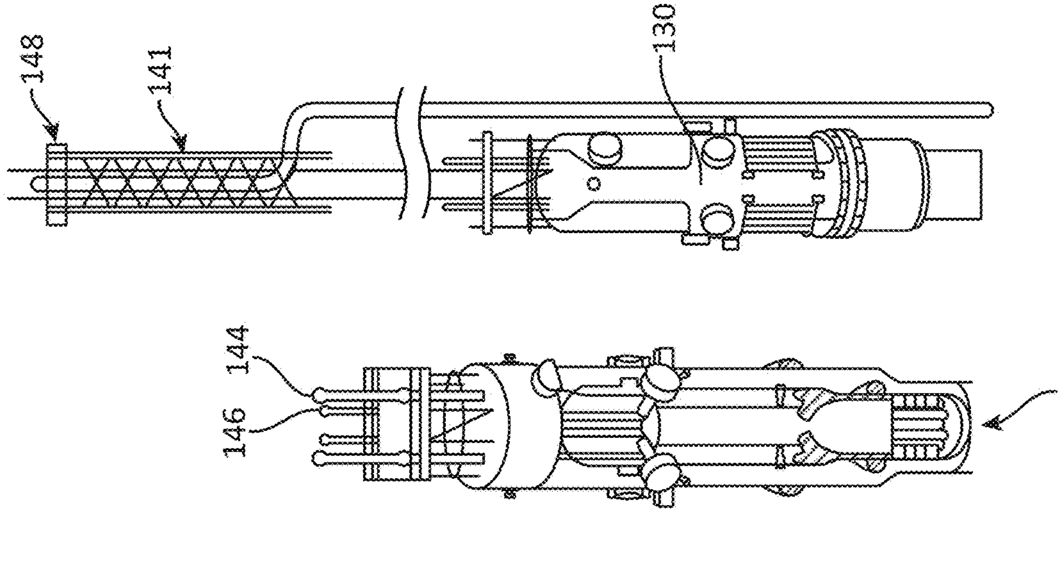

Referring additionally to FIGS. 13A and 13B, as shown, each nuclear reactor 130 can include a support structure 141 that is preassembled before insertion of the nuclear reactor 130 in the monopile structure 112 so that the steam inlet lines 144, the secondary fluid return lines 146, and other connecting lines are supported and extend above the top end of the monopile structure 112. The support structures 141 can facilitate securing the supported lines to the balance of plant systems, such as the steam turbines 142 on the offshore vessel 140, as discussed in greater detail below. Note that during transportation from the dry dock or onshore manufacturing facility to the site of the offshore power generation facility 110, the reactors 130 can be wrapped for environmental protection. These wraps can be removed prior to installing each nuclear reactor 130 in its corresponding monopile structure 112.

A power generator may be a specialized (e.g., custom) generator designed to operate in a monopile structure. However, in other embodiments, the power generator may be a modular generator (e.g., licensed or certified by a regulatory entity) to be installed and to operate in different environments. A modular generator may be prefabricated, transported to an operation site, and then installed at the site. A modular generator may be contained in a containment vessel (e.g., top containment vessel 108 and bottom containment vessel 107). In embodiments with modular generators, the inner sleeve of the monopile structure may be specialized or configured to house a modular generator. Thus, modular generators may be brought to a monopile structure and installed within.

Figure 4A:
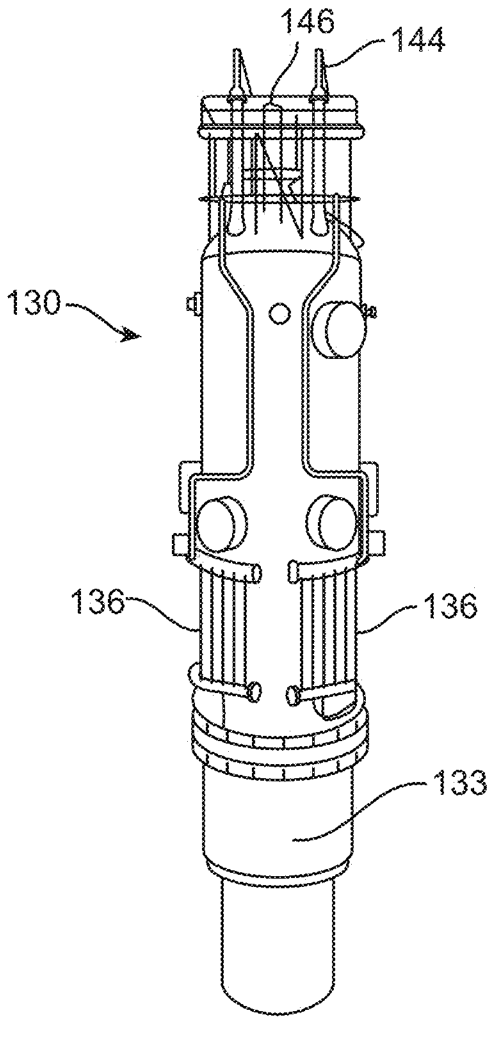
FIGS. 4A and 4B are a side view and a partial cross-sectional side view of a modular nuclear thermal reactor of the offshore power generation facility shown in FIG. 1A, representing one example of the many types of reactors that could be employed in the monopile.
Figure 4B:
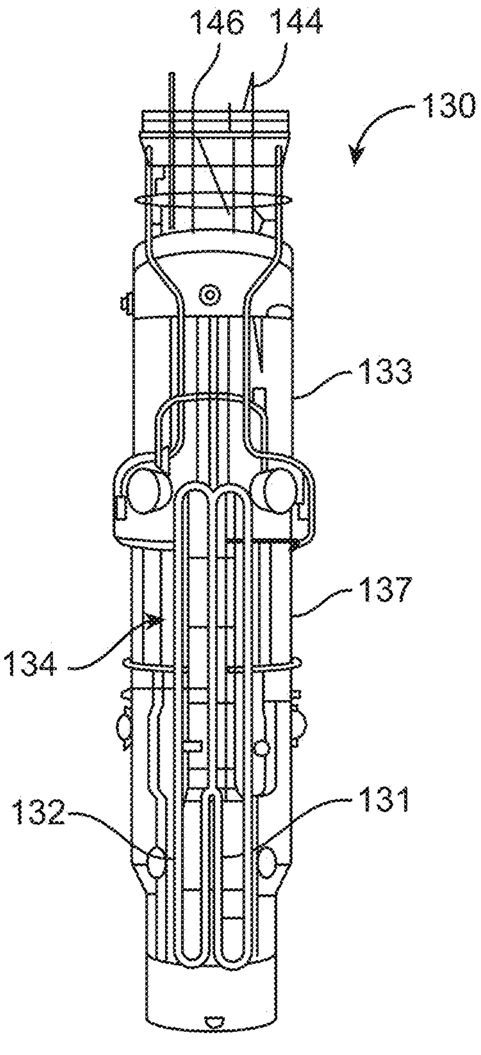

FIGS. 4A and 4B illustrate an example modular nuclear reactor (which is an example of a modular generator) that can be installed in a monopile structure 112. More specifically, FIGS. 4A and 4B illustrate diagrams of a NUSCALE® Small Modular Reactor (SMR). Note that FIG. 4B is a cross sectional diagram. The NUSCALE® SMR is a light water reactor that is passively safe and pre-certified by the U.S.

Nuclear Regulatory Commission. The nuclear reactor 130 includes a primary fluid side 132 that is on a continuous cooling loop through the core 131 of the nuclear reactor 130 and remains within the pressure vessel 133 of the nuclear reactor 130 at all times. The secondary fluid side 134 passes through a heat exchange area 137 in which it is heated into steam by the primary fluid side 132. The secondary fluid steam travels upwardly out of the monopile structure 112 though the steam lines 144 to the balance of plant steam turbines 142 on the offshore vessel 140. Multiple decay heat removal heat exchangers 136 can be provided outside the pressure vessel 133 of each nuclear reactor 130 to allow for the removal of decay heat during reactor shutdown and/or potential accidents through natural circulation in the pool of water 178 disposed in the interior of the monopile structure 112. After a nuclear reactor 130 is installed in each corresponding monopile structure 112, a lid 124 (e.g., FIG. 7A) is secured to the top end of each monopile structure 112 so that the monopile structure 112 forms another barrier to the environment. In some embodiments, check valves 128 (see e.g., FIG. 2G) are provided in the side walls of the monopile structure 112 below the top level 192 of the body of water 191. In use, the check valves 128 can be configured to allow cooling water to enter the interior of the monopile structures 112 in the event the water level inside the monopile drops below a certain level. However, in other embodiments, check valves 128 are not provided. Other potential reactor types include heavy water moderated reactors, molten salt reactors, lead or sodium cooled reactors, and high temperature gas reactors.

Power Generator Control Structures

Figure 5B:
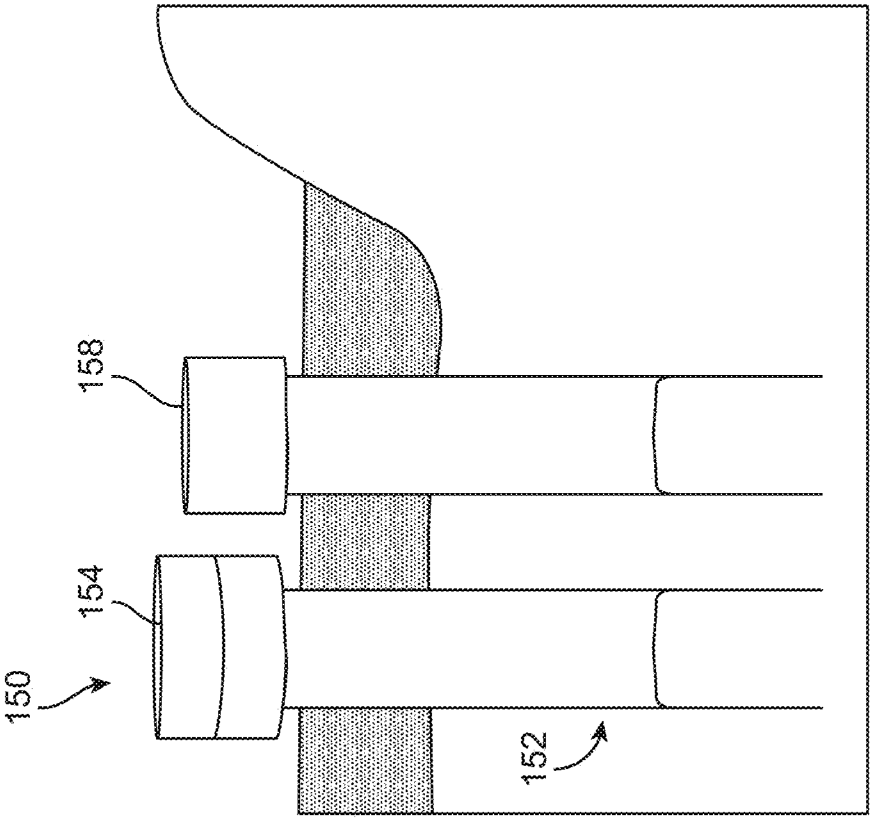
FIGS. 5A and 5B are diagrams of the reactor control room and radioactive waste monopile structures of the offshore power generation facility shown in FIG. 1A.
Figure 5A:
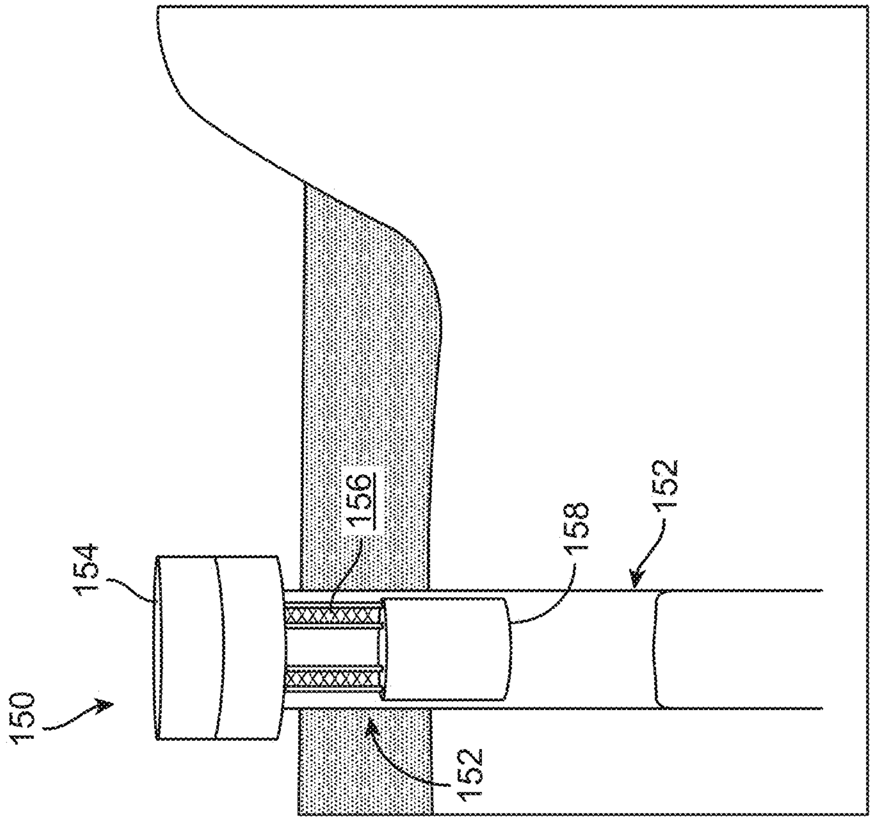

Referring now to FIGS. 5A and 5B, the offshore power generating facility 110 includes a control monopile structure 150 that is configured to house personnel required to operate the power generation portion of the offshore power generation facility 110. The control monopile structure 150 includes a control monopile 152 that may be constructed similarly to the other monopile structures 112, and a control room 154 that is disposed on the top end of the control monopile 150. The control room 154 includes seismic isolation features 156 so that a radioactive waste storage tank 158 may be supported from the reactor control room 154 within the interior of the reactor control monopile 152. Alternatively, the radioactive waste storage tank and the control room can be situated on two separate monopiles.

Offshore Vessels

Figure 6C:
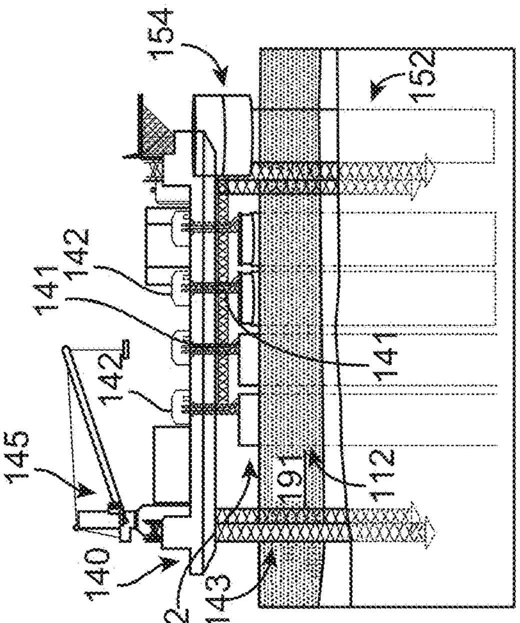
FIGS. 6A through 6C are diagrams of the deployment of the offshore vessel of the offshore power facility shown in FIG. 1A.
Figure 6B:
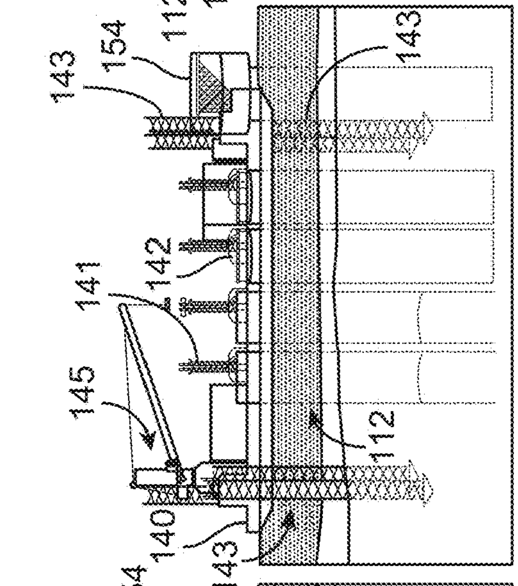
Figure 6A:
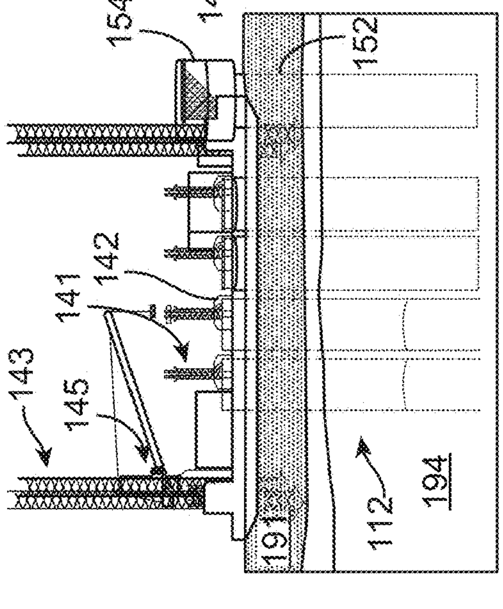

Referring now to FIGS. 6A through 6C, the balance of plant systems for the offshore power generation facility 110 are provided on offshore vessel 140. As shown, the offshore vessel 140 can be in the form of a barge with a plurality of support legs 143 that allow the offshore vessel 140 to be both anchored to the earthen bed 194 and raised above the top surface 192 of the body of water 191. Among other advantages, the offshore vessel 140 can be moved if needed or desired. For example, if a storm is coming toward the offshore power generation facility 110 that may damage the offshore vessel 140, the offshore vessel 140 may be moved to a safer location.

As shown in FIG. 6A, the offshore vessel 140 can include components of the balance of plant systems such as multiple steam turbines 142, electric generators/transformers 166, makeup water, chemical volume control systems, and a crane 145.

Figure 7A:
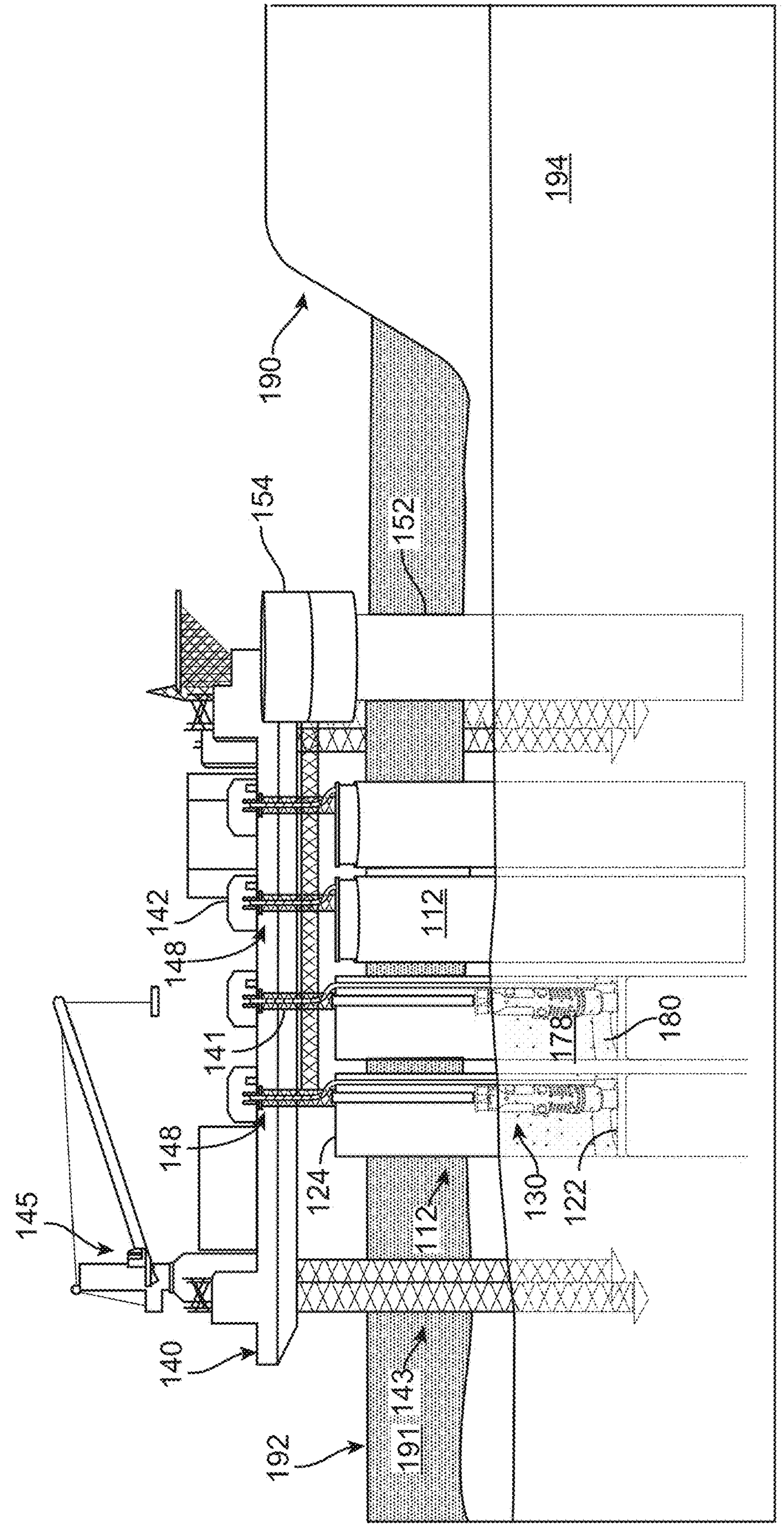
FIGS. 7A and 7B are diagrams showing the connection of the offshore power generation facility shown in FIG. 1A to an onshore power generation substation.
Figure 7B:
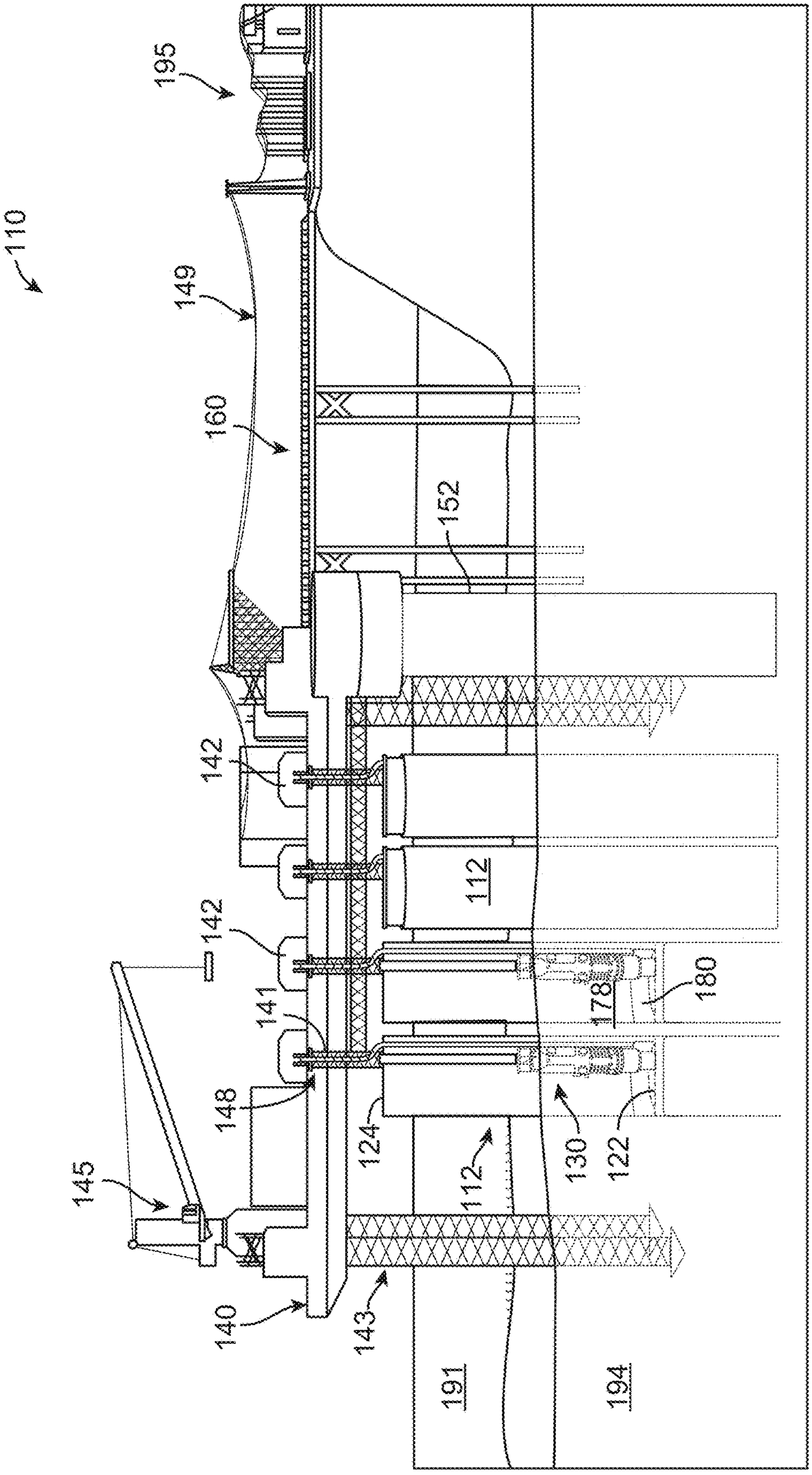

Once the offshore vessel 140 is in the desired position adjacent to the monopile structures 112 and the reactor control monopile structure 150, the support legs 143 can be driven downwardly into the earthen bed 194. As shown in FIG. 6B, with the support legs 143 firmly embedded, the offshore vessel 140 is moved upwardly along the support legs 143 until the vessel is raised above the top surface 192 of the body of water 191 by the desired distance. Referring additionally to FIG. 7A, once the offshore vessel 140 is raised, the nuclear reactors 130 can be connected to the steam turbines 142 and the reactor control room 154 by robust support structures 141 that protect the power cables, steam lines 144, secondary fluid return lines 146, etc. At or near the completion of the offshore power generating facility 110, a causeway 160 that extends from the shoreline 190 to the offshore vessel 140 and control room 154 can be constructed to facilitate access to the offshore power facility 110 by operational personnel (e.g., see FIG. 7B). Having a permanent land-based access can also facilitate the addition and removal of equipment and conducting of repairs. Note, in some embodiments a drawbridge (not shown) may be included in the structure of the causeway for enhanced security as a means of limiting access to the offshore vessel 140.

Refueling Structures and Processes

Figure 9A:
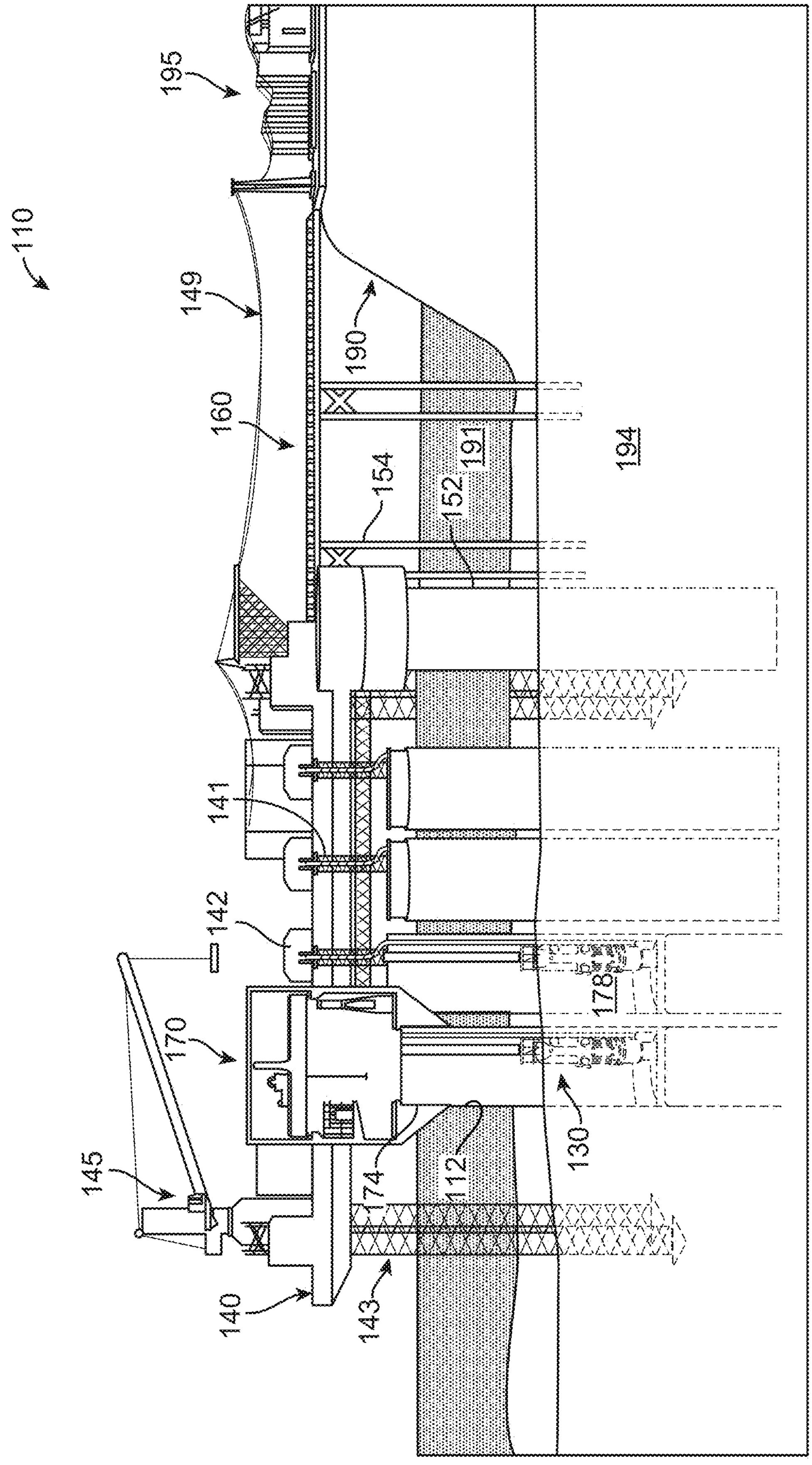
FIGS. 9A, 9B, and 9C are diagrams of the refueling process components of a nuclear reactor of the offshore power generation facility shown in FIG. 1A.
Figure 9B:
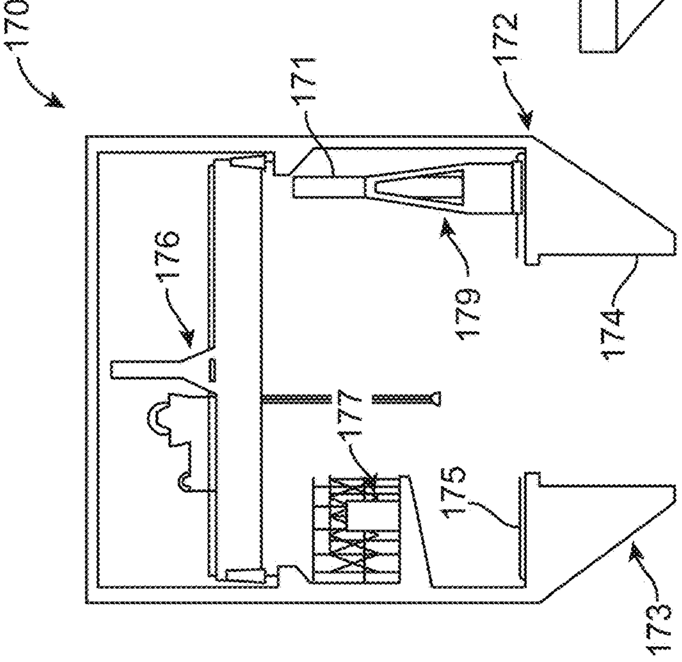
Figure 9C:
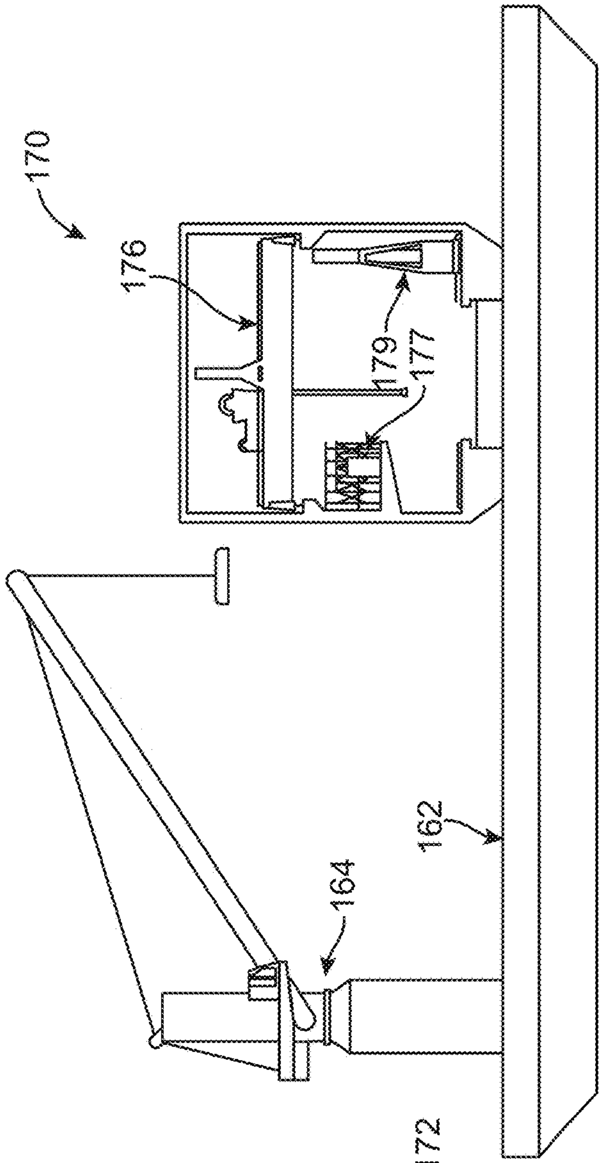

Referring now to FIGS. 9A, 9B, and 9C, a refueling structure and a process of refueling a nuclear reactor 130 of the offshore power generation facility 110 are described. An example refueling module 170 includes a bottom wall 172 with a mounting structure 173 descending downwardly therefrom, and the mounting structure 173 defines a mounting aperture 174 that is configured to seal to the top end of the corresponding monopile structure 112. A first gantry crane 176, a new fuel container 177, and a second gantry crane 179 having a fuel arm 171 can be disposed within the refueling module 170 prior to transporting the refueling module 170 to the offshore power generation facility 110 on a barge 162, as shown in FIG. 9C. During the refueling process, the radiologically controlled areas include the monopile structure 112, the refueling module 170 which is attached thereto, and the radiological waste storage 158 (e.g., see FIG. 5A) contained in the reactor control monopile 152. Note that, in some embodiments, the radiological waste storage 158 is contained on a monopile that is independent of the reactor control monopile 152, as shown in FIG. 5B. Among other advantages, the refueling module 170 may contain (e.g., all) tools and components used to refuel a nuclear reactor 130 in a monopile structure 112. Additionally, in some embodiments, the refueling module 170 is a separate mobile structure required for nuclear fuel access and handling and clearly visible to external observers, such as the Internal Atomic Energy Agency (IAEA) (e.g. via satellite). In these embodiments, the refueling module 170 helps reduce clandestine proliferation activities (e.g. plutonium breeding or radiological material theft). Additionally, since the refueling module 170 is an enclosed structure that seals to the monopile structure 112, the refueling module 170 helps reduce spread of contamination and radioactive material.

Figure 10B:
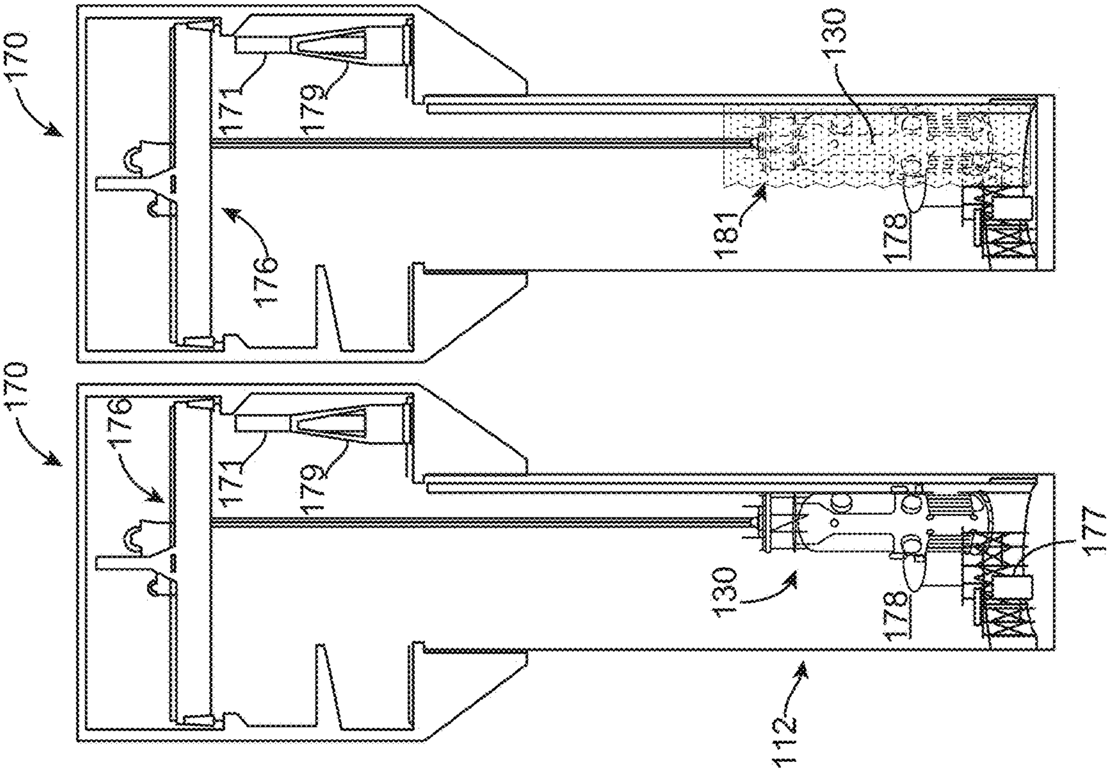
FIGS. 10A through 10E are diagrams of a first example refueling process, in accordance with an embodiment of the present disclosure.
Figure 10A:
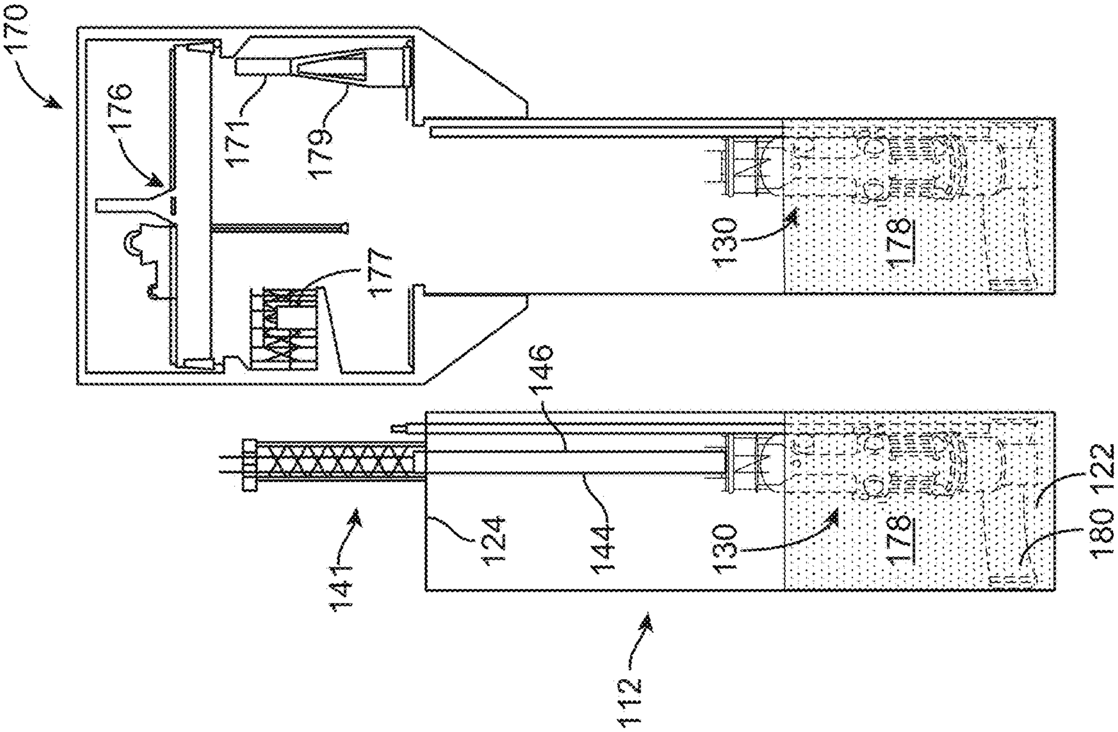

Referring now to FIGS. 10A through 10E, during the refueling process, the nuclear reactor 130 to be refueled is shut down. Referring to FIG. 10A, the steam lines 144, the secondary fluid return lines 146, and the support structures 141 can be removed from the nuclear reactor 130, and the refueling module 170 can be placed on the top end of the corresponding monopile structure 112. The refueling module 170 may be mounted to the top end of the monopile structure 112 (e.g., without any other support structures). In some embodiments, the refueling module 170 includes support legs that can descend to the earthen bed to support the refueling module 170. This may allow the refueling module 170 to move from monopile to monopile as a waterborne vessel and "jack-up around" the monopile for each refuel outage.

With the refueling module 170 in place, sealed, and negative ventilation established so that a radiological control area is established, the lid 124 of the monopile structure 112 can be removed (however, the lid 124 may be removed before the refueling module 170 is in place). Additionally, once access to the interior of the monopile structure 112 is established, the tools for de-tensioning the vessels and the new fuel container 177 may be lowered to the bottom floor 122 of the monopile structure 112 (for example, with the first gantry crane 176) if those tools are not already in the cavity (e.g., the de-tensioning tools may remain in the inner sleeve 120). The first gantry crane 176 may also be used to move the reactor 130 around as needed for the process of disassembling and exposing the nuclear core 131 for fuel changes. For example, the bottom containment vessel (also "lower containment vessel") is separated from the top containment vessel via a containment flange tool. Afterwards, the nuclear core 131 is separated from the nuclear reactor 130 via a reactor flange tool (since the core holds fuel, it may be referred to as a fuel storage container). The first gantry crane 176 may also be used to surround the upper containment structure with a shroud 181 for foreign object exclusion. In an example, the shroud is a (e.g., 360 degree) curtain that goes around the upper reactor internals during refueling to help prevent debris and tools from reaching the rest of the borated pool, particularly the open reactor core and spent fuel racks.

Figure 10E:
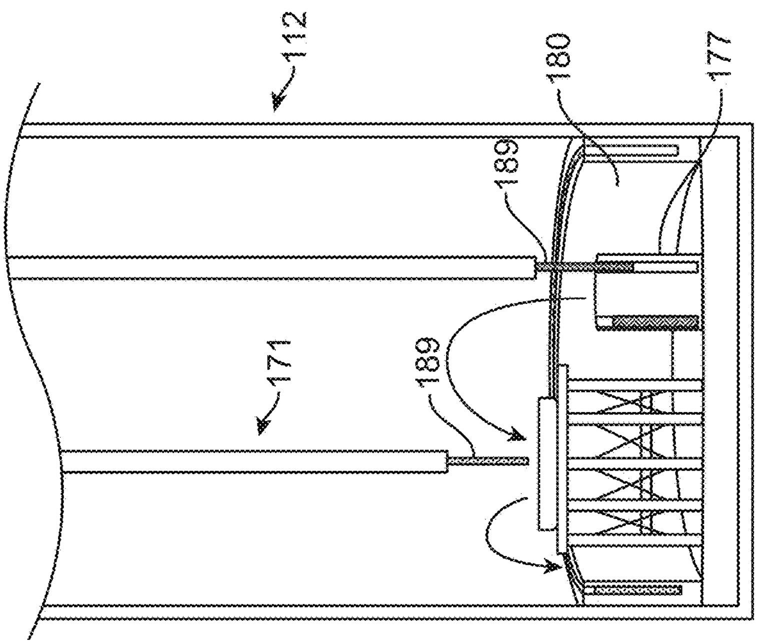
Figure 10D:
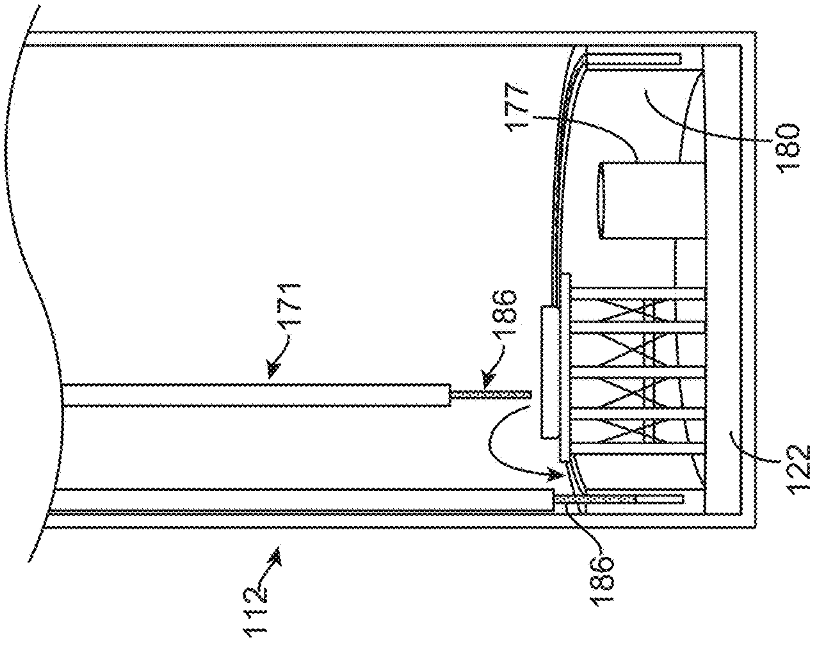
Figure 10C:
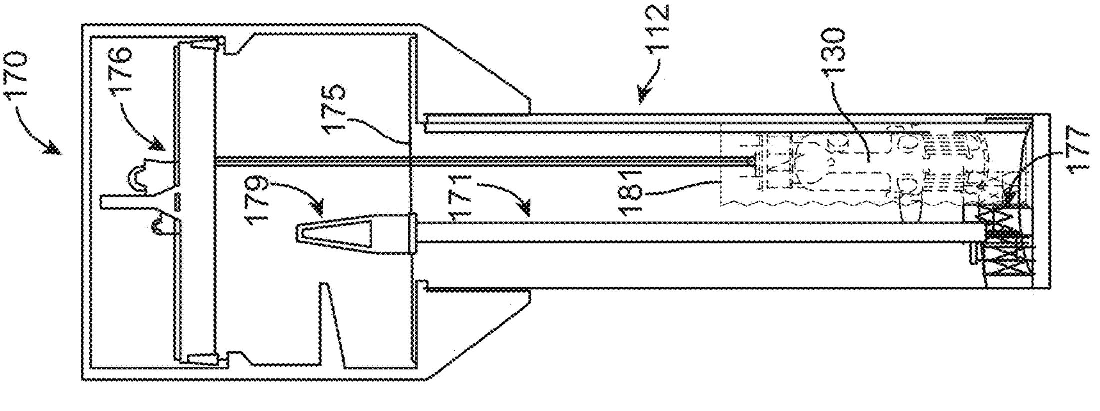

Referring now to FIG. 10C, the tracks 175 for the second gantry crane 179 can be connected across the open end of the monopile structure 112, and the second gantry crane 179 can lower the fuel arm 171 into the interior of the monopile structure 112 so that the spent fuel assemblies 186 may be removed from the reactor core 131. As shown in FIG. 10D, the fuel arm 171 of the second gantry crane 179 is used to remove spent fuel assemblies 186 one at a time from the core 131 of the nuclear reactor 130 and place the spent fuel assemblies 186 in the annular spent fuel storage container 180 that is disposed along the cylindrical side wall of the monopile structure 112. As shown in FIG. 10E, after the spent fuel assemblies 186 have been removed from the reactor core, the fuel arm 171 of the second gantry crane 179 is now used to retrieve new fuel assemblies 189 from the new fuel container 177 and place each new fuel assembly 189 in one of the positions left open by removal of the spent fuel assemblies 186. After the spent fuel assemblies 186 have been replaced by the new fuel assemblies 189, the proceeding steps are performed in reverse order to bring the nuclear reactor 130 back online. Note that the refueling process may be performed with the borated water in the cavity of the inner sleeve 120 (e.g., although water 178 is not illustrated in FIGS. 10B-10E, it may be present). Other reactor types will involve varying versions of this procedure for refueling depending on the form factor of the fuel and the size of the containment. For example, a Holtec SMR-160 may include the gantry crane and refueling machine being inside the containment at all times. Depending on the nuclear reactor, in some embodiments, a spent fuel assembly is a rectangular cube with dimensions of approximately 8.5 inches by 8.5 inches by ninety-four (or one hundred eighty-eight) inches.

FIGS. 14A-14D includes a flowchart and diagrams explaining a second example refueling process, in accordance with an embodiment of the present disclosure. The second example refueling process includes additional steps than those illustrated in FIGS. 10A-10E. The second example refueling process can include additional or fewer steps than described herein. Additionally, the steps can be performed in different order, or by different components than described herein.

Figure 14A:
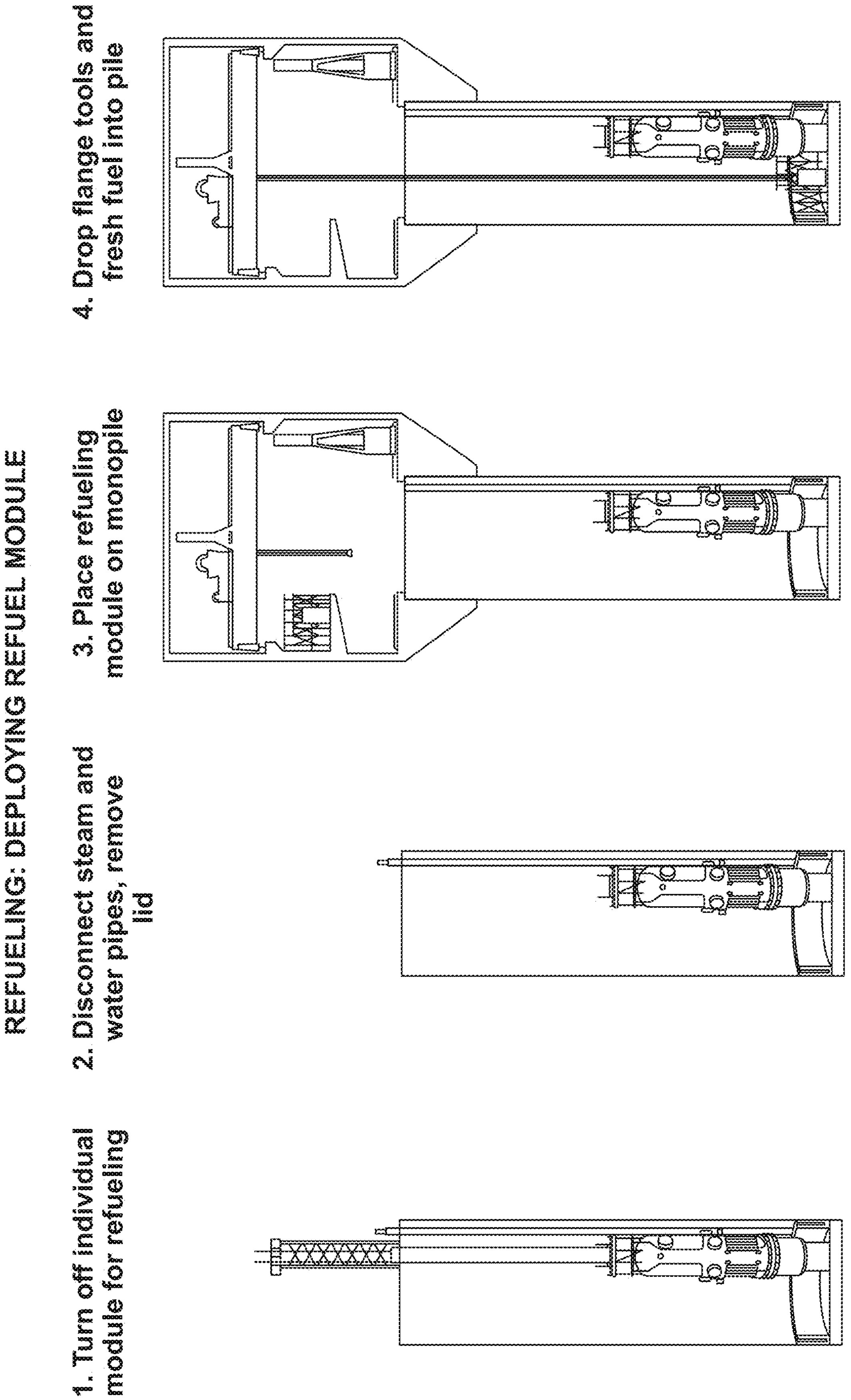
FIGS. 14A-14D includes a flowchart and diagrams explaining a second example refueling process, in accordance with an embodiment of the present disclosure.
Figure 14B:
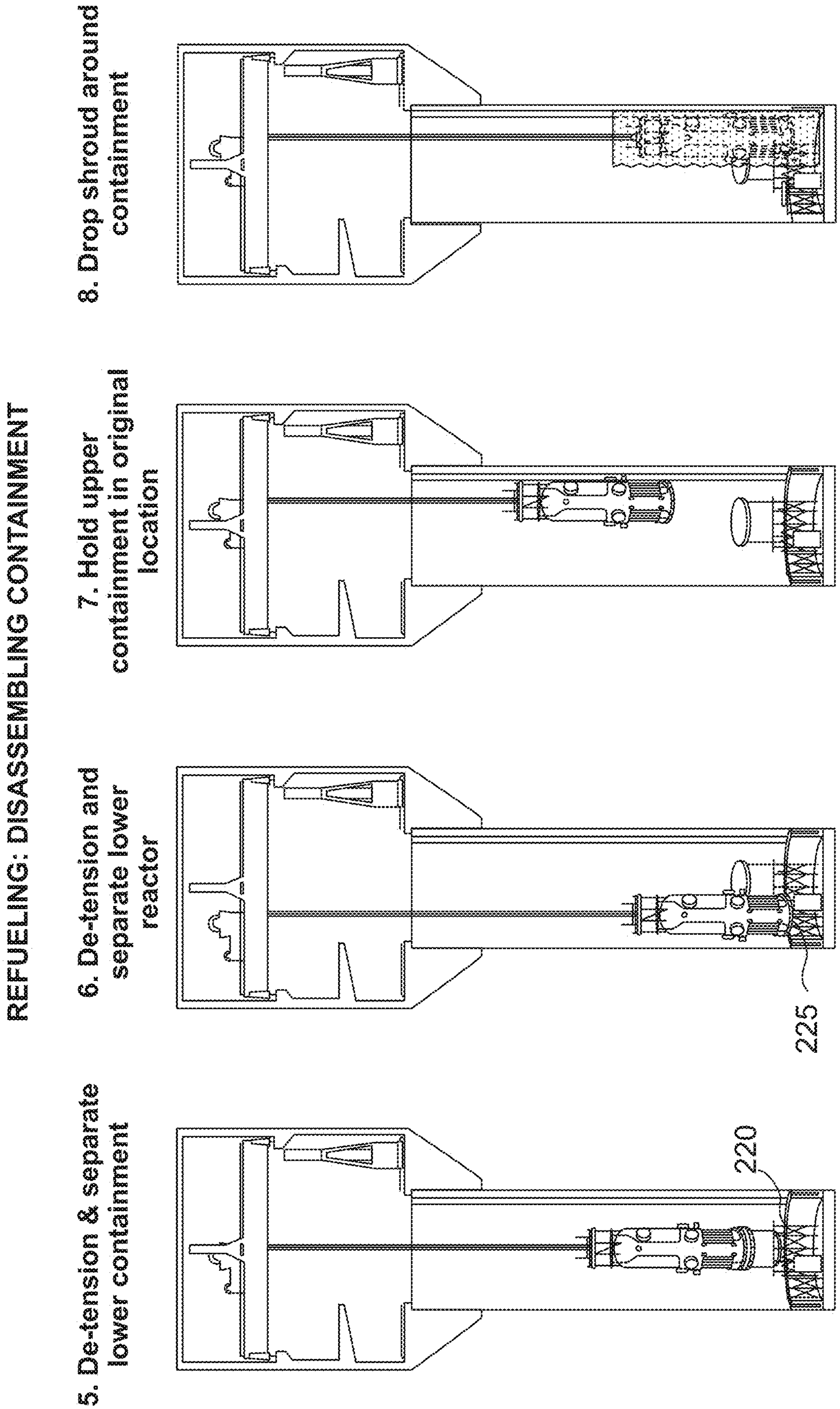
Figure 14C:
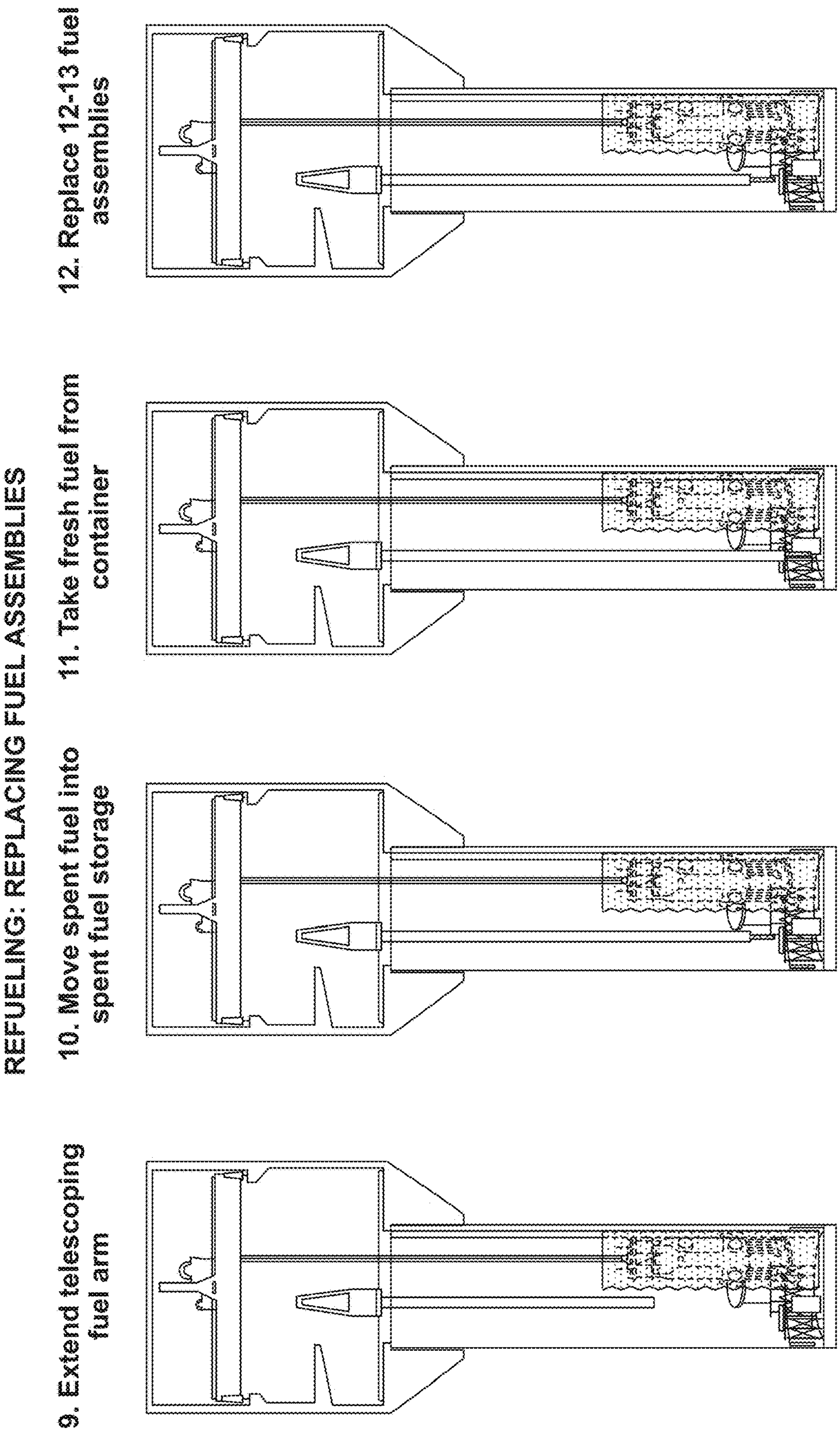
Figure 14D:
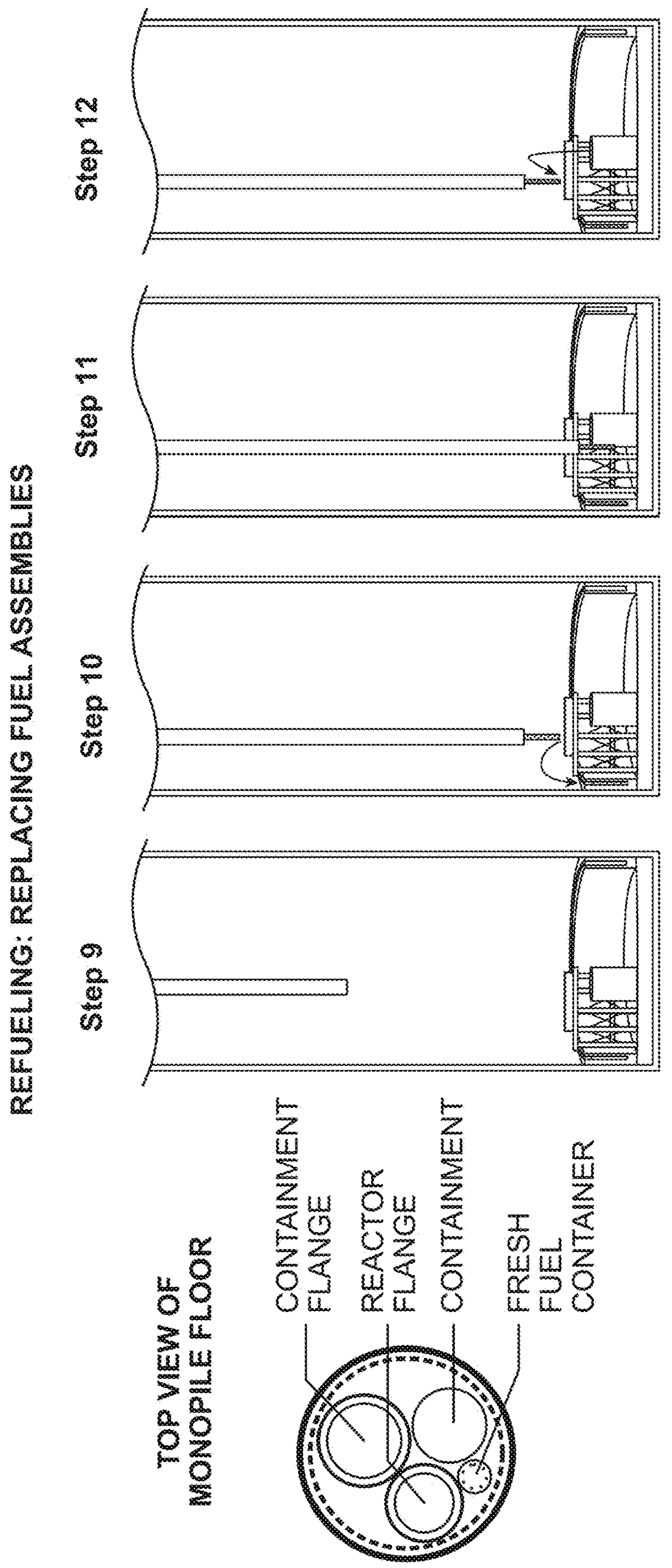

At step 1, the nuclear reactor is turned off. At step 2, the steam and water pipes are disconnected. Also, the lid is removed. At step 3, the refueling module is placed on the monopile structure. At step 4, flange tools and a new fuel container are lowered into the cavity of the monopile structure by a crane (which may be part of a crane system). The flange tools include a containment flange tool and a reactor flange tool. The left diagram of FIG. 14D illustrates a top-down view that illustrates example locations of the containment vessel, flange tools, and new fuel container in the cavity. At step 5, the crane moves the reactor to the containment flange. Using the containment flange tool, containment mechanisms (e.g., studs, bolts, or screws) of the lower containment vessel are de-tensioned and the lower containment vessel is separated from the upper containment vessel. At step 6, the crane moves the upper containment vessel to the reactor flange tool. Using the reactor flange tool, containment mechanisms (e.g., studs, bolts, or screws) of the lower reactor (also "fuel storage container") are de-tensioned and the lower reactor is separated from the upper reactor and containment vessels. At step 7, the crane moves the upper containment and reactor vessels to the nuclear reactor's original location in the monopile structure 112. At step 8, a shroud is installed around the upper containment and reactor vessels to protect it (in other embodiments, step 8 may or may not be performed). At step 9, a (e.g., telescoping) fuel arm is lowered into the cavity. At step 10, the fuel arm moves spent fuel from the lower reactor to the spent fuel storage container. At step 11, the fuel arm removes fresh fuel from the new fuel container. At step 12, the fuel arm moves the removed fresh fuel to the lower reactor. Steps 10-12 may be repeated multiple times depending on the amount of fuel that should be replaced. Magnified views of steps 9-12 are illustrated in FIG. 14D.

Spent Fuel Storage Containers

Figure 11D:
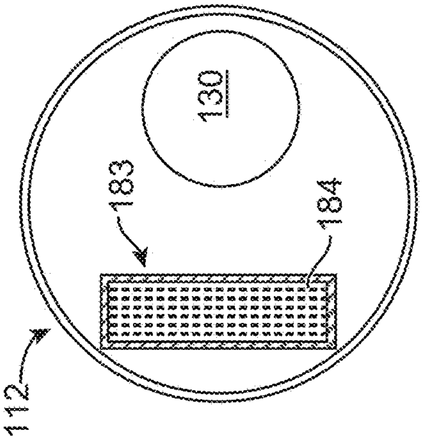
FIGS. 11A through 11E are cross-sectional diagrams of spent fuel storage containers in accordance with embodiments of the present disclosure.
Figure 11C:
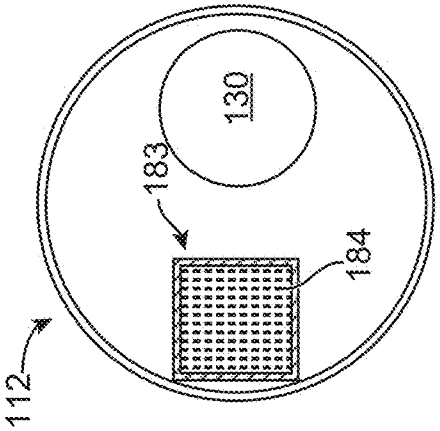
Figure 11B:
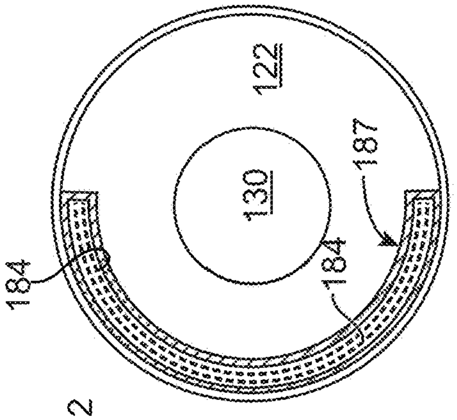
Figure 11A:
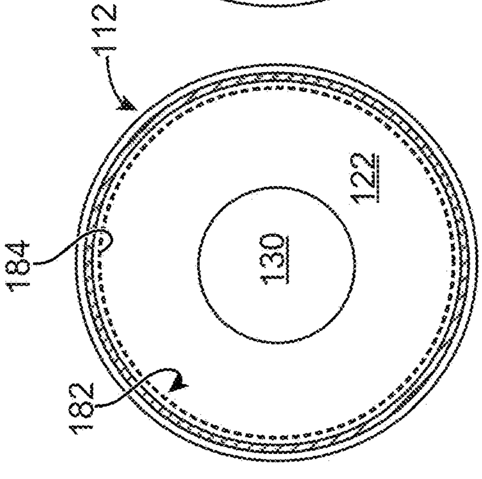

FIGS. 11A through 11E are views of the inside of the inner sleeve from a top-down view. FIGS. 11A-11E show various embodiments of spent fuel storage containers 180 that store spent fuel assemblies in borated water, in accordance with embodiments of the present disclosure. Spent fuel storage containers are generally described as being on or near the bottom of the inner sleeve, however this is not required. For example, a spent fuel storage container may be raised above the floor of the sleeve (e.g., on a platform or mounted to a middle section of the wall). FIG. 11A shows an annular spent fuel storage container 180 in the form of a ring 182, where the ring 182 being comprised of a plurality of storage receptacles 184. The container is along the circumference of the cavity. For example, the container may be arranged around the inside of the inner sleeve in the outer monopile. Each storage receptacle 184 is configured to receive a single spent fuel assembly 186 therein (e.g., an assembly includes a bundle of fuel rods). In some embodiments, multiple concentric rings 182 may be used to increase capacity. As shown in FIG. 11B, a half ring 187 arrangement of a spent fuel storage container may include two layers and, therefore, have the same capacity as the embodiment shown in FIG. 11A (however any number of layers may be used). The storage capacity may be enough for a threshold number of fuel cycles (e.g., ten fuel cycles) worth of spent fuel in each monopile structure having a reactor. FIGS. 11C and 11D show grid 183 designs rather than curved designs. The number of storage receptacles 184 may be determined by the number of refueling cycles that the nuclear reactor 130 is designed for.

Spent fuel storage containers arranged along a wall of the cavity may be coupled (e.g., mounted) to the wall. However, this is not required. Spent fuel storage containers arranged along a wall of the cavity (curved arrangements in this example) may provide specific advantages. Firstly, these arrangements may be more space efficient, and thus allow more room for other components, such as the new fuel container 177 and the flanges (e.g., compare the available space in FIG. 11A versus FIG. 11C). Secondly, these arrangements further spread out the spent fuel assemblies, which may be safer, increase heat dissipation, and decrease possible hot spots (hot spots can increase corrosion).

Additional Example Offshore Power Generation Facilities

Some aspects relate to an offshore power generation facility (e.g., 110) disposed in a body of water (e.g., 191) over an earthen bed (e.g., 194), including: at least one monopile structure (e.g., 112) including at least one monopile and having a bottom end and a top end, the bottom end of the at least one monopile structure being disposed in the earthen bed and the top end extending above a top surface of the body of water; and a nuclear reactor (e.g., 130) disposed within an interior volume of the at least one monopile structure (note that that monopile may additionally or alternatively house other power generators as well).

In some aspects, the techniques described herein relate to an offshore power generation facility, wherein the at least one monopile of the at least one monopile structure further includes an outer monopile (e.g., 116) and an inner sleeve (e.g., 120) disposed within the outer monopile, and wherein the outer monopile is driven into the earthen bed.

In some aspects, the techniques described herein relate to an offshore power generation facility, wherein the outer monopile is cylindrical in shape and defines a throughbore and the inner sleeve is cylindrical in shape and includes a bottom floor and an open top end.

In some aspects, the techniques described herein relate to an offshore power generation facility, the monopile structure further including a grout (e.g., 121) or shock absorbing material (e.g., 121*a*) disposed in a cylindrical void defined between the inner surface of the outer monopile and the outer surface of the inner sleeve.

In some aspects, the techniques described herein relate to an offshore power generation facility, wherein the outer monopile is constructed of carbon steel and the inner sleeve is constructed of stainless steel.

In some aspects, the techniques described herein relate to an offshore power generation facility, wherein the inner sleeve further includes a cylindrical body portion constructed of carbon steel and an inner cladding constructed of stainless steel or other corrosion resistant material such as epoxy, that is secured to an inner surface of the body portion.

In some aspects, the techniques described herein relate to an offshore power generation facility, wherein the at least one monopile structure further includes a plurality of monopile structures, each monopile structure including a nuclear reactor disposed therein.

In some aspects, the techniques described herein relate to an offshore power generation facility, wherein the nuclear reactor includes a thermal nuclear light water reactor.

In some aspects, the techniques described herein relate to an offshore power generation facility, wherein the nuclear reactor is a pre-certified modular reactor.

In some aspects, the techniques described herein relate to an offshore power generation facility, further including: a refueling module including (e.g., 170): a bottom end defining a mounting aperture (e.g., 174) that is configured to be selectively received adjacent a top end of the at least one monopile structure; a gantry crane (e.g., 176) disposed within an interior volume of the refueling module; and a removable or openable lid (e.g., 124) disposed on the top end of a corresponding monopile structure of the at least one monopile structure, wherein the lid and the corresponding monopile structure are configured to form a containment structure.

In some aspects, the techniques described herein relate to an offshore power generation facility, wherein the gantry crane is configured to remove the lid from the corresponding monopile structure when the mounting aperture of the refueling module is disposed adjacent the top end of the corresponding monopile structure.

In some aspects, the techniques described herein relate to an offshore power generation facility, wherein the refueling module is configured to form a portion of the containment structure when the lid is removed from the top end of the corresponding monopile structure.

In some aspects, the techniques described herein relate to an offshore power generation facility, further including an annular spent fuel storage container (e.g., 180) disposed near or adjacent a bottom floor (e.g., 122) of the at least one monopile structure.

In some aspects, the techniques described herein relate to an offshore power generation facility, the annular spent fuel storage container including at least one ring of storage receptacles, each storage receptacle being configured to receive a spent fuel assembly therein.

In some aspects, the techniques described herein relate to an offshore power generation facility, wherein the at least one ring of storage receptacles further includes a plurality of concentric rings of storage receptacles.

Figure 11E:
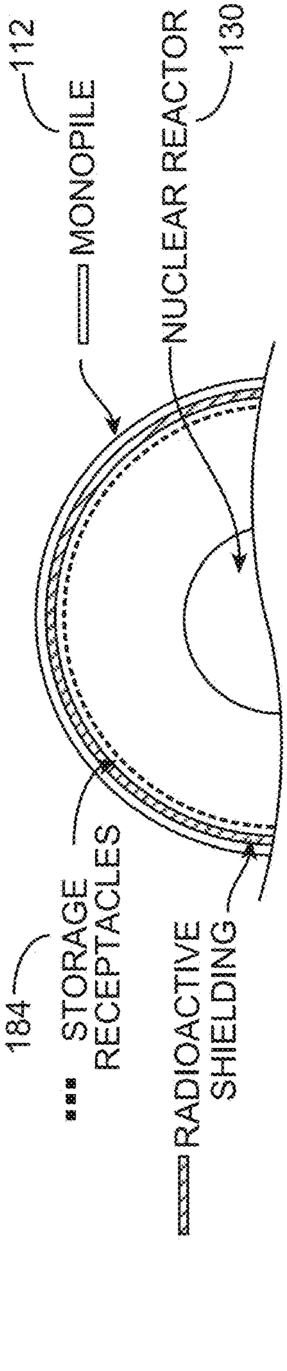

In some aspects, the techniques described herein relate to an offshore power generation facility, the annular spent fuel storage container further including an annular outer radiological shield (e.g., see FIG. 11E).

In some aspects, the techniques described herein relate to an offshore power generation facility, further including: a reactor control monopile structure including: a reactor control monopile (e.g., 152) including a top end and a bottom end, the bottom end of the reactor control monopile being driven into the earthen bed; a reactor control room (e.g., 154) mounted to the top end of the reactor control monopile, wherein the reactor control room is operably connected to the nuclear reactor so that the nuclear reactor is remotely operable from the control room structure.

In some aspects, the techniques described herein relate to an offshore power generation facility, further including seismic isolation features disposed between the top end of the reactor control monopile and the reactor control room.

In some aspects, the techniques described herein relate to an offshore power generation facility, further including a radioactive waste storage tank(s) (e.g., 158) disposed within an interior volume of the reactor control monopile or on a separate monopile.

In some aspects, the techniques described herein relate to an offshore power generation facility, wherein the radioactive waste storage tank(s) is suspended from the reactor control room.

In some aspects, the techniques described herein relate to an offshore power generation facility, further including: an offshore vessel disposed adjacent to a corresponding monopile structure of the at least one monopile structure; at least one steam line disposed on the offshore vessel, the at least one steam turbine being operably connected to a secondary fluid side of the nuclear reactor in the corresponding monopile structure.

In some aspects, the techniques described herein relate to an offshore power generation facility, wherein the at least one steam turbine is operably coupled to the nuclear reactor by a steam inlet line and a secondary fluid return line.

In some aspects, the techniques described herein relate to an offshore power generation facility, further including a plurality of disconnects disposed in the steam inlet line and the secondary fluid return line configured to allow the at least one steam turbine to be disconnected from the nuclear reactor.

In some aspects, the techniques described herein relate to an offshore power generation facility, wherein the offshore vessel is selectively secured to the earthen bed.

In some aspects, the techniques described herein relate to an offshore power generation facility, further including a causeway having a drawbridge extending from a shoreline of the body of water to the offshore vessel.

In some aspects, the techniques described herein relate to an offshore power generation facility, wherein the causeway is permanently secured to the earthen bed.

In some aspects, the techniques described herein relate to a method of constructing an offshore power generation facility in a body of water over an earthen bed, including the steps of driving a bottom end of each monopile structure of at least one monopile structure into the earthen bed; and disposing a nuclear reactor in an interior volume of a corresponding monopile structure of the at least one monopile structure.

In some aspects, the techniques described herein relate to a method, wherein the at least one monopile includes an outer monopile and an inner monopile, and wherein the step of driving a bottom end of each monopile structure of at least one monopile structure into the earthen bed includes: driving a bottom end of the outer monopile into the earthen bed; removing the earthen bed material from at least a portion of an interior of the outer monopile; and disposing the inner sleeve in the interior of the outer monopile.

In some aspects, the techniques described herein relate to a method, further including filling an annular void defined between the outer monopile and the inner sleeve with a grouting or shock absorbing material.

In some aspects, the techniques described herein relate to a method, further including disposing of a spent fuel storage container adjacent the bottom floor of the inner sleeve.

In some aspects, the techniques described herein relate to a method, wherein the nuclear reactor includes a thermal nuclear light water reactor.

In some aspects, the techniques described herein relate to a method, wherein the nuclear reactor is a modular reactor.

In some aspects, the techniques described herein relate to a method, further including: mounting a refueling module onto a top end of a corresponding monopile structure of the at least one monopile structure, the refueling module including a mounting aperture defined in a bottom surface thereof; and accessing the interior volume of the monopile structure.

In some aspects, the techniques described herein relate to a method, further including forming a seal between the mounting aperture of the refueling module and the top end of the corresponding monopile structure so that an interior volume of the refueling module and the interior volume of the corresponding monopile structure form a radiological containment.

In some aspects, the techniques described herein relate to a method, further including positioning an offshore vessel adjacent the corresponding monopile structure, positioning at least one steam turbine on the offshore vessel; and placing the at least one steam turbine in fluid communication with a secondary fluid side of the nuclear reactor.

In some aspects, the techniques described herein relate to a method, further including providing a causeway from a shoreline of the body of water to the offshore vessel; and securing the causeway to the earthen bed.

In some aspects, the techniques described herein relate to a method, further including securing the offshore vessel to the earthen bed.

Other aspects include components, devices, systems, improvements, methods, processes, applications, computer readable mediums, and other technologies related to any of the above.

Additional Example Inner Sleeves

In some aspects, the techniques described herein relate to an inner sleeve (e.g., 120) for an integrated monopile system (e.g., 112), the inner sleeve configured to be contained within an outer monopile (e.g., 116) that is installed in an earthen substrate (e.g., 194). The inner sleeve includes at least one side wall (e.g., 200), an open top end (e.g., 210), a closed bottom end (e.g., 205, see also floor 122), where a cavity (e.g., 114) is formed within the side wall, the open top end, and the closed bottom end. The cavity is configured to house a power generator (e.g., 130) positioned inside the inner sleeve on or adjacent to the closed end, the power generator being accessible through the open top end, and an end cap coupled to the side wall.

In some aspects, the techniques described herein relate to an inner sleeve, wherein the cavity is configured to hold liquid (e.g., 178) and the power generator is at least partially submerged in the liquid (e.g., see FIG. 1B).

In some aspects, the techniques described herein relate to an inner sleeve, wherein: the earthen substrate is below a body of water (e.g., 191); and the liquid in the cavity of the inner sleeve, when contained within the outer monopile, is below the top surface of the body of water outside of the outer monopile (e.g., see FIGS. 1A-1B).

In some aspects, the techniques described herein relate to an inner sleeve, wherein the power generator is a modular nuclear reactor.

In some aspects, the techniques described herein relate to an inner sleeve, wherein the cavity of the inner sleeve is watertight.

In some aspects, the techniques described herein relate to an inner sleeve, wherein: the earthen substrate is below a body of water, and when the inner sleeve is contained within the outer monopile: a top end of the outer monopile is above the body of water; and the open top end of the inner sleeve is above the body of water (e.g., see FIG. 1B).

In some aspects, the techniques described herein relate to an inner sleeve, wherein: the earthen substrate is below a body of water; and the inner sleeve is positioned to house the power generator below the top surface of the body of water (e.g., FIG. 8B).

In some aspects, the techniques described herein relate to an inner sleeve, wherein the inner sleeve is positioned to house the power generator below a surface of the earthen substrate outside of the outer monopile (e.g., FIG. 1B).

In some aspects, the techniques described herein relate to an inner sleeve, wherein the cavity has a cylindrical shape.

In some aspects, the techniques described herein relate to an inner sleeve, wherein the width of the cavity of the inner sleeve is less than the height of the power generator.

In some aspects, the techniques described herein relate to an inner sleeve, wherein a width of the cavity of the inner sleeve prevents the power generator from being positioned horizontally in the cavity.

In some aspects, the techniques described herein relate to an inner sleeve, wherein the cavity is configured to house a single power generator.

In some aspects, the techniques described herein relate to an inner sleeve, wherein the cavity is not configured to house multiple power generators.

In some aspects, the techniques described herein relate to an inner sleeve, wherein the cavity is configured to house the power generator offset from the center of the cavity (e.g., see FIG. 1B and the position of the "containment" in the left diagram of FIG. 14D).

In some aspects, the techniques described herein relate to an inner sleeve, wherein the cavity is not configured to house the power generator in the center of the cavity (e.g., see FIG. 1B and the position of the "containment" in the left diagram of FIG. 14D).

In some aspects, the techniques described herein relate to an inner sleeve, wherein the inner sleeve includes a spent fuel storage container (e.g., 180) at the closed bottom end (e.g., at 122), the spent fuel storage container configured to hold spent fuel from the power generator.

In some aspects, the techniques described herein relate to an inner sleeve, wherein the spent fuel storage container is arranged along an edge of the cavity formed by the at least one side wall and the closed bottom end (e.g., see FIGS. 11A and 11B).

In some aspects, the techniques described herein relate to an inner sleeve, wherein the cavity of the inner sleeve has a cylindrical shape, and the spent fuel storage container is arranged along the circumference of the cylindrical shape (e.g., see FIGS. 11A and 11B).

In some aspects, the techniques described herein relate to an inner sleeve, further including a steam line (e.g., 144) and a water line (e.g., 146) configured to extend from the power generator to an energy conversion system external to the inner sleeve (e.g., one or more systems of 140 and/or the balance of plant systems).

In some aspects, the techniques described herein relate to an inner sleeve, wherein the cavity houses a containment flange tool configured to de-tension containment flange coupling mechanisms of the power generator (e.g., studs, bolts, or screws).

In some aspects, the techniques described herein relate to an inner sleeve, wherein the cavity houses a reactor flange tool configured to de-tension coupling mechanisms of a lower reactor vessel (e.g., studs, bolts, or screws) of the power generator.

In some aspects, the techniques described herein relate to an integrated monopile system (e.g., 112) including: an outer monopile (e.g., 116) having an open top end (e.g., 230), an open bottom end (e.g., 235), and at least one side wall (e.g., 250) surrounding a cavity within (e.g., 115), the open bottom end of the outer monopile installed in an earthen substrate (e.g., 194) at the bottom of a body of water (e.g., 191); and an inner sleeve (e.g., 120) contained within the outer monopile, the inner sleeve having an open top end (e.g., 210), a closed bottom end (e.g., 205), and at least one side wall (e.g., 200) surrounding a cavity within (e.g., 114), the cavity configured to house a power generator (e.g., 130) positioned inside the inner sleeve on or adjacent to the closed end (e.g., on or at 122).

In some aspects, the techniques described herein relate to an integrated monopile system, wherein the inner sleeve in the outer monopile forms an annular cavity.

In some aspects, the techniques described herein relate to an integrated monopile system, wherein the inner sleeve in the outer monopile forms an annular configuration.

In some aspects, the techniques described herein relate to an integrated monopile system, wherein the inner sleeve is concentrically contained within the outer monopile.

In some aspects, the techniques described herein relate to an integrated monopile system, further including a base configured to sit on the earthen substrate below the inner sleeve and within the outer monopile (e.g., 109).

In some aspects, the techniques described herein relate to an integrated monopile system, wherein the closed bottom end of the inner sleeve is coupled to the base.

In some aspects, the techniques described herein relate to an integrated monopile system, wherein the base is a concrete pad.

In some aspects, the techniques described herein relate to an integrated monopile system, further including a micropile (e.g., 240) with a first portion in the base and a second portion in the earthen substrate.

In some aspects, the techniques described herein relate to an integrated monopile system (e.g., 112), wherein (e.g., air or water) pressure outside the outer monopile (e.g., 116) is greater than (e.g., air or water) pressure in the cavity (e.g., 114) of the inner sleeve (e.g., 116). This may be accomplished by setting the air pressure and/or the water level in the cavity so that the pressure is lower than outside the outer monopile. For example, the water level in the cavity is lower than the water level of the body of water outside the outer monopile (e.g., see FIG. 1B). Among other advantages, if a leak forms in the integrated monopile system, then the fluid flow direction (e.g., of water or air) is inward, toward the cavity, which may reduce or prevent material (e.g., fluid) from leaving the cavity (e.g., this may be advantageous for containing radioactive material inside the cavity).

In some aspects, the techniques described herein relate to an integrated monopile system, wherein the outer monopile extends further into the earthen substrate than the inner sleeve (e.g., see FIG. 1A).

In some aspects, the techniques described herein relate to an integrated monopile system, further including couplers that couple the inner sleeve to the base.

In some aspects, the techniques described herein relate to an integrated monopile system, further including a grouting material (e.g., 121) or shock absorbing material (e.g., 121*a*) between the inner sleeve and the outer monopile.

In some aspects, the techniques described herein relate to an integrated monopile system, further including the power generator installed in the inner sleeve.

In some aspects, the techniques described herein relate to an integrated monopile system (e.g., 112) including: an inner sleeve (e.g., 120) configured to be installed in an outer monopile (e.g., 116) that is installed in an earthen substrate (e.g., 194), the inner sleeve: (a) having an open end (e.g., 210) and a closed end (e.g., 205) formed by one or more side walls (e.g., 205) and an end cap (e.g., floor 122) coupled to the one or more side walls, and (b) forming a cavity (e.g., 114) configured to house a power generator (e.g., 130) at the closed end (e.g., at or on 122).

In some aspects, the techniques described herein relate to an integrated monopile system, further including: the outer monopile, wherein the outer monopile includes an open top end and an open bottom end, wherein the bottom end is installed in the earthen substrate.

Other aspects include components, devices, systems, improvements, methods, processes, applications, computer readable mediums, and other technologies related to any of the above.

Additional Example Refueling Modules

In some aspects, the techniques described herein relate to a refueling module (e.g., 170) configured to refuel a power generator (e.g., 130) installed in an integrated monopile system (e.g., 112), a bottom end of the integrated monopile system (e.g., 235 and/or 205) installed in an earthen substrate (e.g., 194), the integrated monopile system including a cavity (e.g., 114) containing the power generator, the refueling module including: a mounting structure (e.g., 173) with an aperture (e.g., 174) configured to receive a top end of the integrated monopile system (e.g., 210, 230, 124, or any combination thereof); and a crane system (e.g., including 176 and/or 179) configurable over the cavity of the integrated monopile system when the top end of the integrated monopile system is in the aperture.

In some aspects, the techniques described herein relate to a refueling module, wherein the mounting structure is configured to form a seal with the top end of the integrated monopile system in the aperture (e.g., see FIGS. 10A-10C).

In some aspects, the techniques described herein relate to a refueling module, the refueling module forming an enclosed structure with the top end of the integrated monopile system in the aperture (e.g., see FIGS. 10A-10C).

In some aspects, the techniques described herein relate to a refueling module, wherein the mounting structure is configured to mount the refueling module to the integrated monopile system (e.g., see FIGS. 10A-10C).

In some aspects, the techniques described herein relate to a refueling module, further comprising barge support legs (e.g., support legs similar to 143 but coupled to (e.g., mounted to) the refueling module) configured to extend down to the earthen substrate (e.g., similar to FIGS. 6A-6C (but with respect to the refueling module instead of 140) to support the refueling module over the integrated monopile system.

Other aspects include components, devices, systems, improvements, methods, processes, applications, computer readable mediums, and other technologies related to any of the above.

Additional Example Installations of Integrated Monopile System

Figure 18:
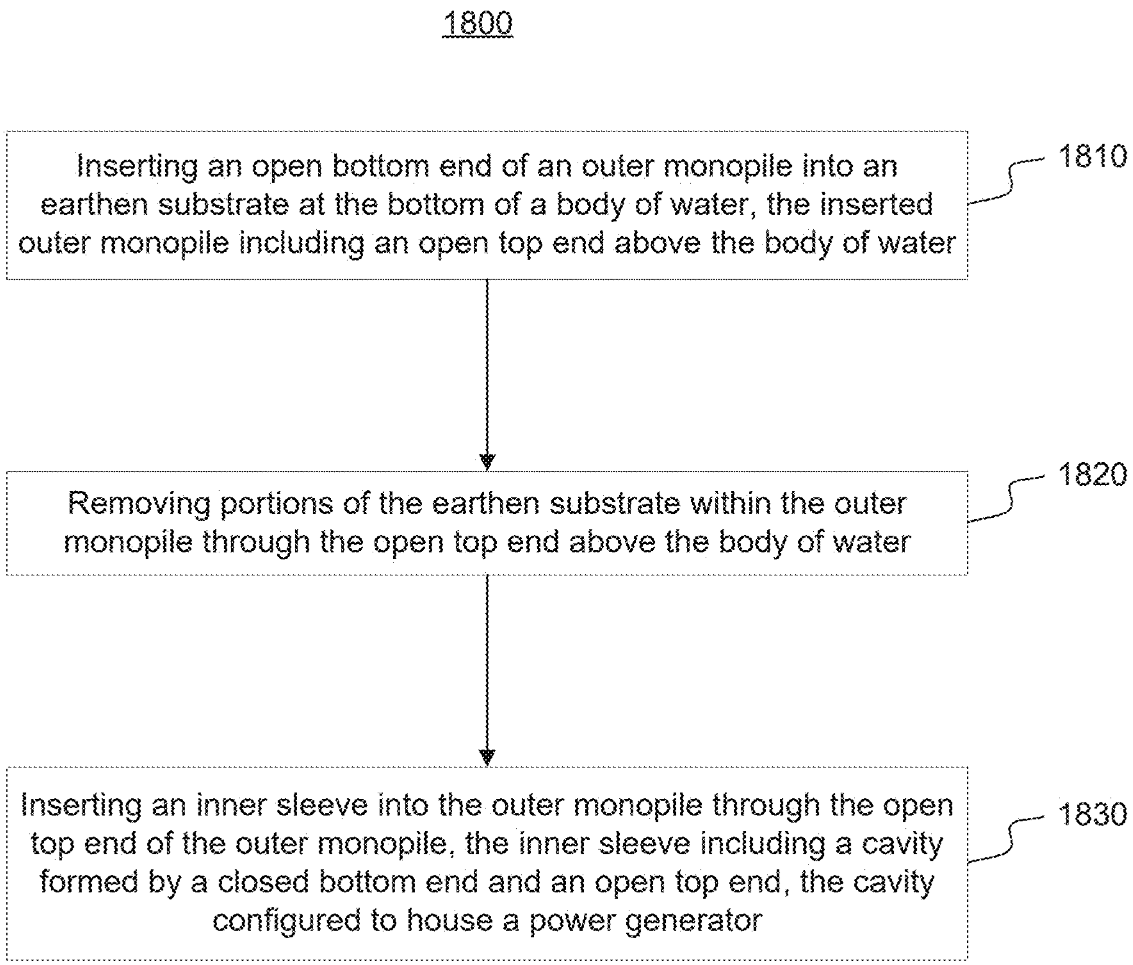
FIG. 18 is a flowchart of an example method for installing an integrated monopile system, in accordance with an embodiment of the present disclosure.

FIG. 18 is a flowchart of an example method 1800 for installing an integrated monopile system (e.g., 112). The method can include additional or fewer steps than described herein. Additionally, the steps can be performed in different order, or by different components than described herein.

At step 1810, an open bottom end (e.g., 235) of an outer monopile is inserted into an earthen substrate (e.g., 194) at the bottom of a body of water (e.g., 191). For example, see FIG. 2A and associated description. The inserted outer monopile includes an open top end (e.g., 230) above the body of water.

At step 1820, portions of the earthen substrate are removed within the outer monopile through the open top end above the body of water (e.g., see FIG. 2C and associated description).

At step 1830, an inner sleeve is inserted into the outer monopile through the open top end of the outer monopile (e.g., see FIG. 2E and associated description). The inner sleeve includes a cavity (e.g., 114) formed by a closed bottom end (e.g., 205) and an open top end (e.g., 210). The cavity is configured to house a power generator (e.g., 130).

Figure 15:
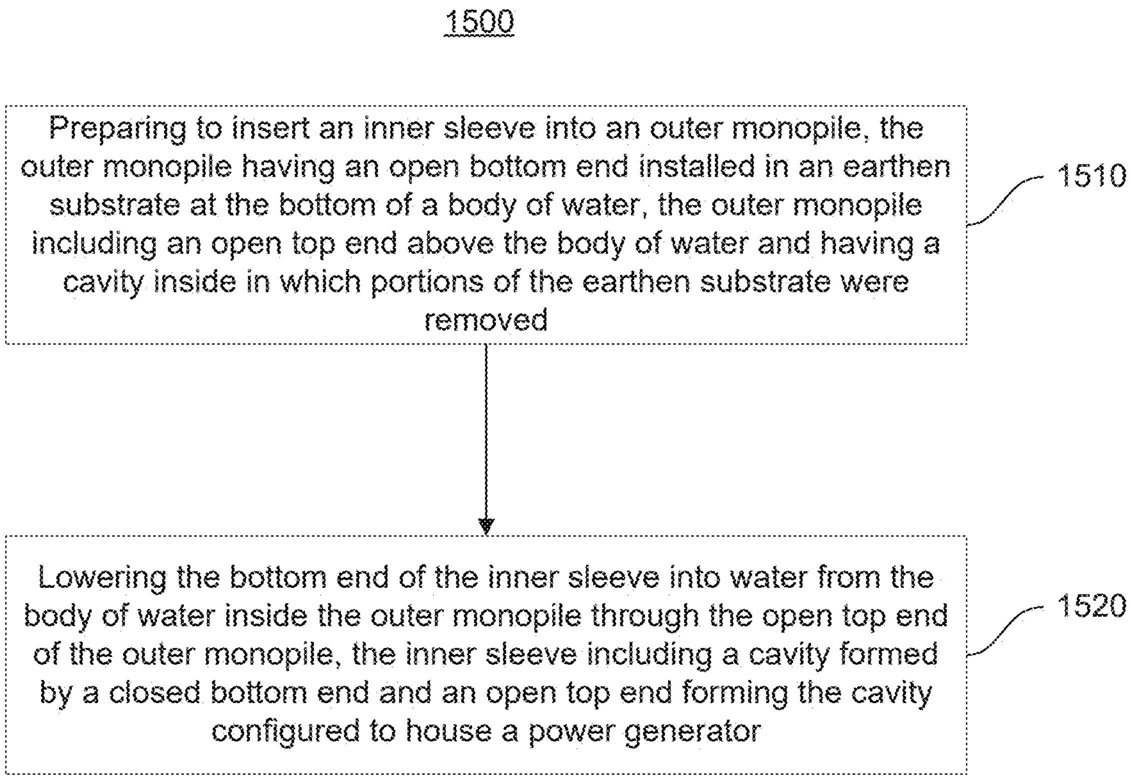
FIG. 15 is a flowchart of an example method for installing an inner sleeve of an integrated monopile system, in accordance with an embodiment of the present disclosure.

FIG. 15 is a flowchart of an example method 1500 for installing an inner sleeve (e.g., 120) of an integrated monopile system (e.g., 112). The method can include additional or fewer steps than described herein. Additionally, the steps can be performed in different order, or by different components than described herein.

At step 1510, the inner sleeve is prepared to be inserted into an outer monopile. For example: a holding mechanism aligns the inner sleeve with the open top end of the outer monopile, confirmation of base mat installation and configuration, final verification measurements prior to inserting sleeve into outer monopile, verification of pre-installed seismic isolation if specified (other than post installation grout), dewatering of outer pile if required, or any combination thereof. The outer monopile has an open bottom end installed in an earthen substrate (e.g., 194) at the bottom of a body of water (e.g., 191), the outer monopile including an open top end above the body of water and having a cavity (e.g., 115) inside in which portions of the earthen substrate were removed (e.g., see FIG. 2C and associated descriptions).

At step 1520, the bottom end of the inner sleeve is lowered into water from the body of water inside the outer monopile through the open top end of the outer monopile (e.g., see FIG. 2E and associated descriptions). The inner sleeve includes a cavity (e.g., 114) formed by a closed bottom end and an open top end forming the cavity configured to house a power generator.

In some aspects, the techniques described herein relate to a method (e.g., 1800 or 1500), further including installing a power generator in the inner sleeve prior to installing the inner sleeve within the outer monopile.

In some aspects, the techniques described herein relate to a method (e.g., 1800 or 1500), further including installing a power generator in the inner sleeve subsequent to installing the inner sleeve within the outer monopile.

In some aspects, the techniques described herein relate to a method (e.g., 1800 or 1500), wherein, prior to insertion of the inner sleeve into the outer monopile, the inner sleeve includes a spent fuel storage container (e.g., 180) at the closed bottom end, the spent fuel storage container configured to hold spent fuel from the power generator (e.g., see FIG. 3E).

In some aspects, the techniques described herein relate to a method (e.g., 1800 or 1500), wherein the spent fuel storage container is arranged along a bottom edge of the cavity.

In some aspects, the techniques described herein relate to a method (e.g., 1800 or 1500), wherein portions of the earthen substrate are removed from within the outer monopile such that, when the power generator is housed in the inner sleeve, the power generator is below the height of the earthen substrate outside of the outer monopile (e.g., see FIG. 1B).

In some aspects, the techniques described herein relate to a method (e.g., 1800 or 1500), further including inserting (e.g., pouring) borated water (e.g., 178) into the cavity of the inner sleeve such that, when the power generator is housed in the inner cavity, at least a portion of the power generator is submerged in the borated water.

In some aspects, the techniques described herein relate to a method (e.g., 1800 or 1500), wherein the water level of the borated water in the inner sleeve is below the top surface of the body of water outside of the outer monopile.

In some aspects, the techniques described herein relate to a method (e.g., 1800 or 1500), further including: subsequent to removing portions of the earthen substrate within the outer monopile, pouring concrete on top of a remaining portion of the earthen substrate within the outer monopile to form a concrete pad within the outer monopile.

In some aspects, the techniques described herein relate to a method (e.g., 1800 or 1500), wherein the inner sleeve is coupled to (e.g., bolted to) the concrete pad.

In some aspects, the techniques described herein relate to a method (e.g., 1800 or 1500), prior to pouring concrete, inserting an open bottom end of a micropile (e.g., 240) into the remaining portion of the earthen substrate, the inserted micropile including an open top end above the remaining portion of the earthen substrate within the outer monopile.

In some aspects, the techniques described herein relate to a method (e.g., 1800 or 1500), wherein subsequent to pouring concrete, the open top end of the micropile is within the concrete.

In some aspects, the techniques described herein relate to a method (e.g., 1800 or 1500), wherein the cavity of the inner sleeve is watertight and inserting the inner sleeve into the outer monopile includes lowering the bottom end of the inner sleeve into water from the body of water inside the outer monopile.

In some aspects, the techniques described herein relate to a method (e.g., 1800 or 1500), wherein inserting the inner sleeve into the outer monopile includes ballasting the inner sleeve.

In some aspects, the techniques described herein relate to a method (e.g., 1800 or 1500), further comprising: inserting grouting material or shock absorbing material between the inner sleeve and the outer monopile (e.g., to help create seismic isolation).

In some aspects, the techniques described herein relate to a method (e.g., 1800 or 1500), further including installing concrete at the bottom end of the outer monopile in the earthen substrate to provide radiation shielding.

In some aspects, the techniques described herein relate to a method (e.g., 1800 or 1500), further including installing a containment flange tool (e.g., 220) and at the bottom end of the inner sleeve (e.g., at or on 122), the containment flange tool configured to de-tension containment flange containment mechanisms (e.g., studs, bolts, or screws) of the power generator. The containment flange tool may be temporarily or permanently installed in the cavity. In a temporary installation embodiment, the containment flange tool may be installed and removed during specific processes, such as the refueling process (in other words, the containment flange tool is not in the cavity during normal operation of the power generator). In contrast, in a permanent installation embodiment, the containment flange tool may remain in the cavity during normal operation of the power generator.

In some aspects, the techniques described herein relate to a method (e.g., 1800 or 1500), further including installing a reactor flange tool at the bottom end of the inner sleeve, the reactor flange tool configured to de-tension containment mechanisms (e.g., studs, bolts, or screws) of a lower reactor vessel of the power generator. The reactor flange tool may be temporarily or permanently installed in the cavity. In a temporary installation embodiment, the reactor flange tool may be installed and removed during specific processes, such as the refueling process (in other words, the reactor flange tool is not in the cavity during normal operation of the power generator). In contrast, in a permanent installation embodiment, the reactor flange tool may remain in the cavity during normal operation of the power generator.

In some aspects, the techniques described herein relate to a method (e.g., 1800 or 1500), wherein inserting the first end of the outer monopile into the earthen substrate includes pile driving the outer monopile into the earthen substrate.

Other aspects include components, devices, systems, improvements, methods, processes, applications, computer readable mediums, and other technologies related to any of the above.

Additional Example Refueling Processes

Figure 16:
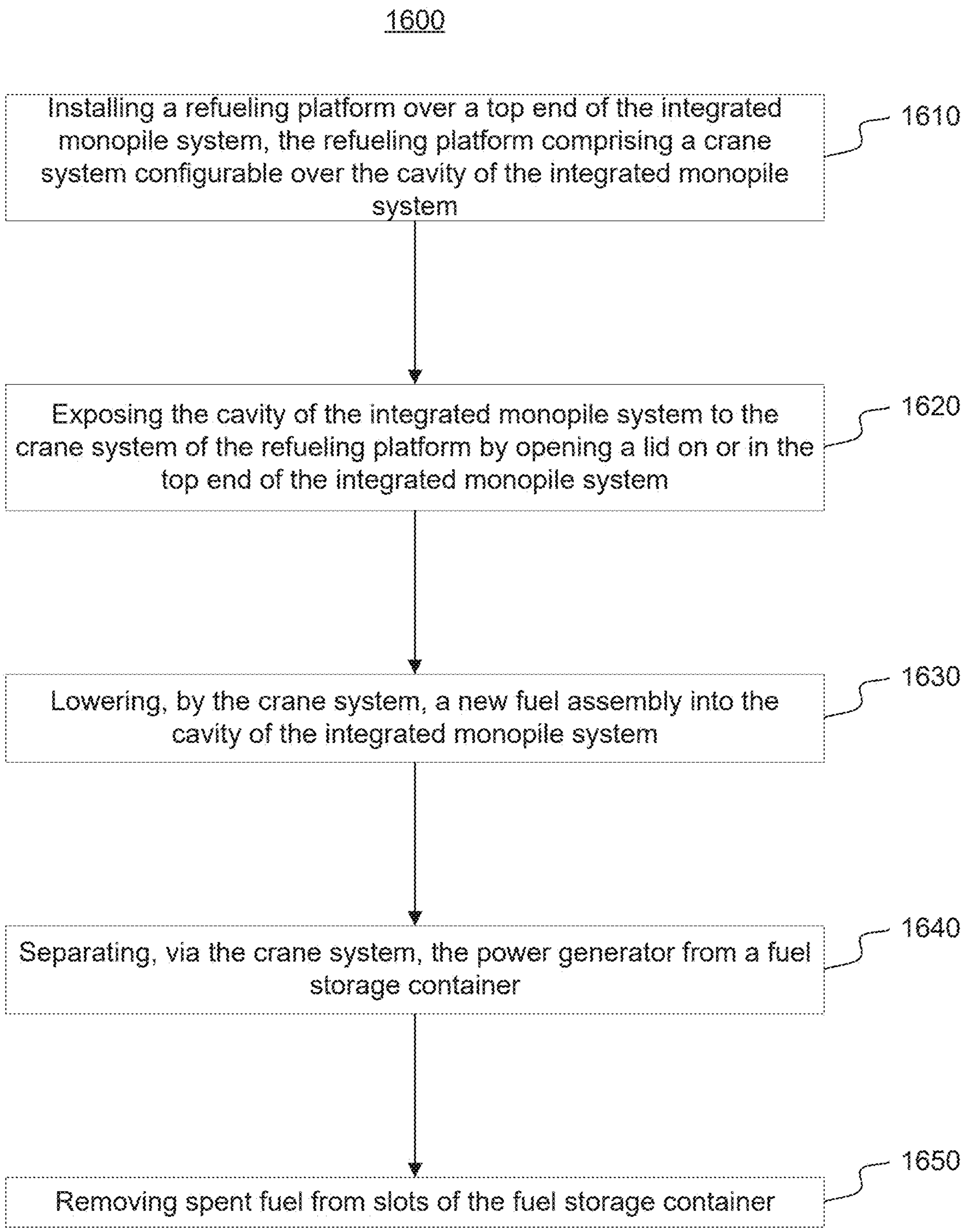
FIG. 16 is a flowchart of an example method of refueling a power generator installed in an integrated monopile system, in accordance with an embodiment of the present disclosure.

FIG. 16 is a flowchart of an example method 1600 of refueling a power generator installed in an integrated monopile system, where a bottom end of the integrated monopile system is installed in an earthen substrate and the integrated monopile system includes a cavity containing the power generator. The method 1600 can include additional or fewer steps than described herein. Additionally, the steps can be performed in different order, or by different components than described herein. Additional details of example refueling processes are also described with respect to FIGS. 9A-10E and 14A-14D.

At step 1610, a refueling platform (e.g., 170) is installed over a top end of the integrated monopile system, the refueling platform comprising a crane system and configurable over the cavity of the integrated monopile system. As used herein, a crane system may refer to any type of system that can lift and place components in the cavity. A crane system may include one or more multiple cranes (e.g., cranes 176 and 179) along with other associated components (e.g., 171 and 175). The refueling platform may form an enclosure when coupled to an integrated monopile system (e.g., see 170 of FIG. 9B) or may be an open structure (e.g., 170 without a ceiling and/or one or more side walls).

At step 1620, the cavity of the integrated monopile system is exposed to the crane system of the refueling platform by opening a lid on or in the top end of the integrated monopile system.

At step 1630, the crane system lowers a new fuel assembly into the cavity of the integrated monopile system.

At step 1640, the crane system separates the power generator from a fuel storage container.

At step 1650, spent fuel is removed from slots of the fuel storage container.

Figure 17:
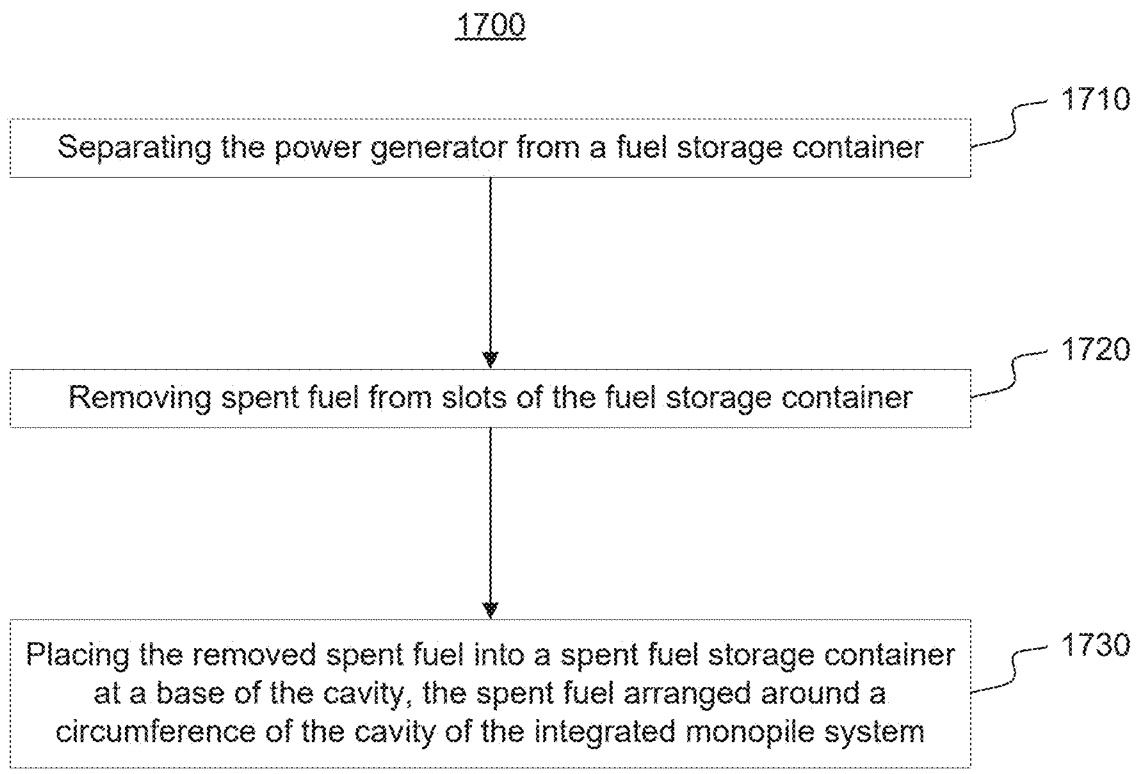
FIG. 17 is a flowchart of an example method for storing spent fuel in an integrated monopile system having a power generator installed inside, in accordance with an embodiment of the present disclosure.

FIG. 17 is a flowchart of an example method 1700 for storing spent fuel in an integrated monopile system having a power generator installed inside, where a bottom end of the integrated monopile system installed in an earthen substrate and the integrated monopile system including a cavity containing the power generator. The method 1700 can include additional or fewer steps than described herein. Additionally, the steps can be performed in different order, or by different components than described herein. Additional details of example refueling processes are also described with respect to FIGS. 9A-10E and 14A-14D.

At step 1710, the power generator is separated from a fuel storage container.

At step 1720, spent fuel is removed from slots of the fuel storage container.

At step 1730, the removed spent fuel is placed into a spent fuel storage container at a base of the cavity, the spent fuel arranged around a circumference of the cavity of the integrated monopile system.

In some aspects, the techniques described herein relate to a method (e.g., 1600 or 1700), further including: placing the removed spent fuel into a spent fuel storage container at a base of the cavity; removing new fuel from the new fuel assembly; placing the removed new fuel into slots of the fuel storage container; and joining, via the crane system, the power generator and the fuel storage container.

In some aspects, the techniques described herein relate to a method (e.g., 1600 or 1700), wherein the spent fuel storage container is disposed along a rounded side wall of the integrated monopile system.

In some aspects, the techniques described herein relate to a method (e.g., 1600 or 1700), wherein the spent fuel storage container surrounds a bottom portion of the power generator.

In some aspects, the techniques described herein relate to a method (e.g., 1600 or 1700), wherein installing the refueling platform includes lowering the refueling platform so that the top end of the integrated monopile system is inserted into an aperture of the refueling platform.

In some aspects, the techniques described herein relate to a method (e.g., 1600 or 1700), wherein installing the refueling platform includes mounting the refueling platform to the top end of the integrated monopile system.

In some aspects, the techniques described herein relate to a method (e.g., 1600 or 1700), wherein installing the refueling platform includes supporting the refueling platform over the top end via barge support legs that extend down to the earthen substrate.

In some aspects, the techniques described herein relate to a method (e.g., 1600 or 1700), further including: removing, via the crane system, the new fuel assembly from the cavity of the integrated monopile system.

In some aspects, the techniques described herein relate to a method (e.g., 1600 or 1700), further including, prior to separating the power generator from the fuel storage container, lowering, by the crane system, a containment flange tool from the refueling platform to the bottom of the cavity.

In some aspects, the techniques described herein relate to a method (e.g., 1600 or 1700), further including, prior to separating the power generator from the fuel storage container, lowering, by the crane system, a reactor flange tool from the refueling platform to the bottom of the cavity.

In some aspects, the techniques described herein relate to a method (e.g., 1600 or 1700), wherein separating the power generator from the fuel storage container includes: detensioning, via the containment flange tool, flange containment mechanisms (e.g., studs, bolts, or screws) of a bottom containment vessel of the power generator; separating the bottom containment vessel from the power generator; detensioning, via the reactor flange tool, flange containment mechanisms (e.g., studs, bolts, or screws) of the fuel storage container; and separating the fuel storage container from the power generator.

In some aspects, the techniques described herein relate to a method (e.g., 1600 or 1700), wherein joining the power generator and the fuel storage container includes: tensioning, via the reactor flange tool, flange containment mechanisms (e.g., studs, bolts, or screws) of the fuel storage container; and tensioning, via the via the containment flange tool, flange containment mechanisms (e.g., studs, bolts, or screws) of the bottom containment vessel.

In some aspects, the techniques described herein relate to a method (e.g., 1600 or 1700), further including: raising, by the crane system, the containment flange tool from the bottom of the cavity to the refueling platform.

In some aspects, the techniques described herein relate to a method (e.g., 1600 or 1700), further including raising, by the crane system, the reactor flange tool from the bottom of the cavity to the refueling platform.

In some aspects, the techniques described herein relate to a method (e.g., 1600 or 1700), further including disconnecting a steam pipe and a water pipe from the power generator.

In some aspects, the techniques described herein relate to a method (e.g., 1600 or 1700), further including, prior to removing the spent fuel from the slots of the fuel storage container, installing a shroud around the power generator.

In some aspects, the techniques described herein relate to a method (e.g., 1600 or 1700), wherein the refueling platform is installed while the power generator is still generating power.

In some aspects, the techniques described herein relate to a method (e.g., 1600 or 1700), further including: prior to exposing the cavity of the integrated monopile system, shutting down the power generator.

Other aspects include components, devices, systems, improvements, methods, processes, applications, computer readable mediums, and other technologies related to any of the above.

Example Machine Architecture

Figure 20:
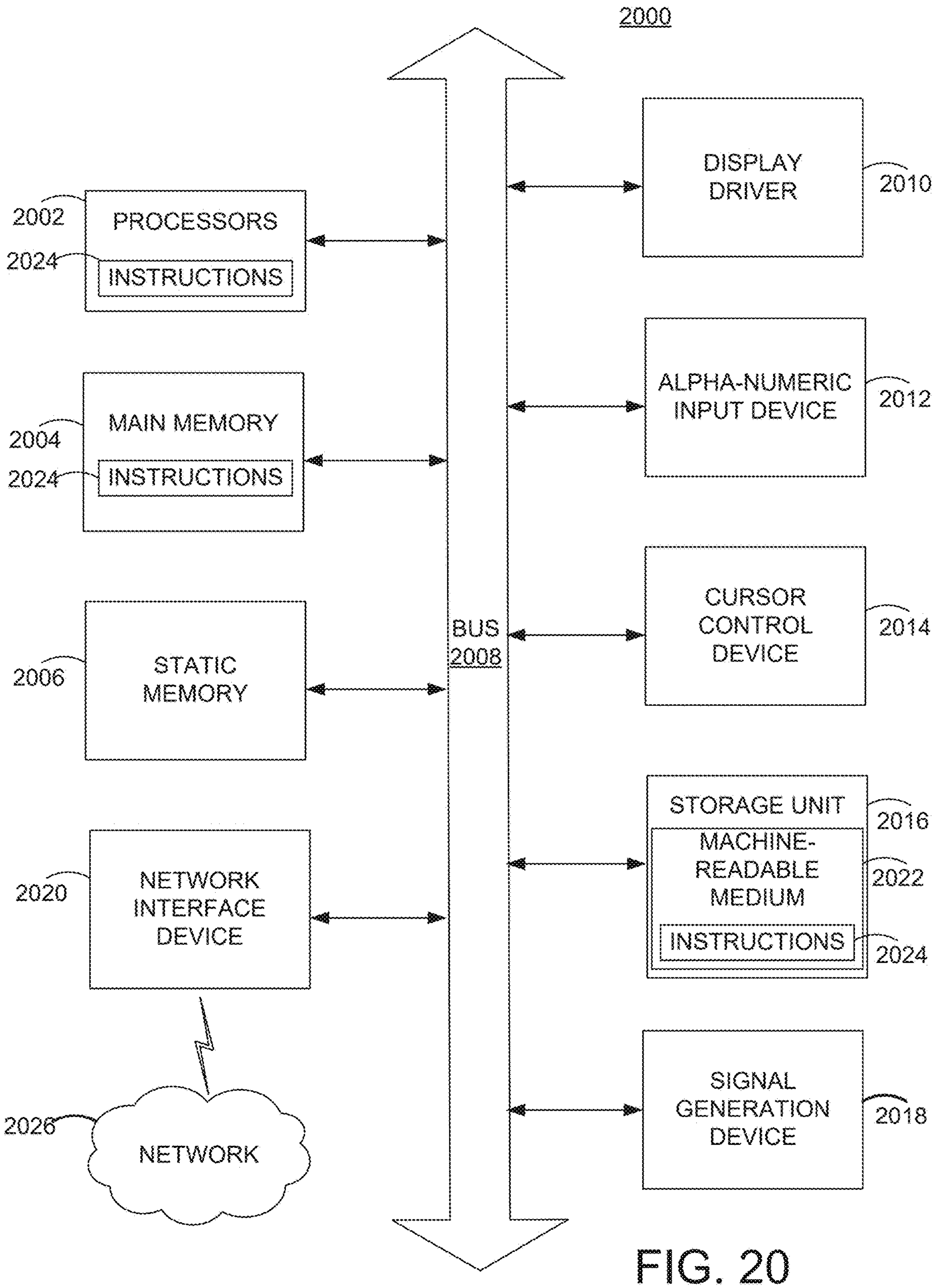
FIG. 20 is a block diagram illustrating components of an example machine able to read instructions from a machine-readable medium and execute them in a processor, according to an embodiment.

FIG. 20 is a block diagram illustrating components of an example machine able to read instructions from a machine-readable medium and execute them in a set of one or more processors. Specifically, FIG. 20 shows a diagrammatic representation of a machine in the example form of a computer system 2000. The computer system 2000 can be used to execute instructions 2024 (e.g., program code or software) to perform any one or more of the methodologies (or processes) described herein (e.g., to perform one or more steps of any of methods 1500, 1600, 1700, 1800). The computer system 2000 may operate as a standalone device or a coupled (e.g., networked) device that connects to other computer systems. In a networked deployment, the computer system may operate in the capacity of a server machine or a client machine in a server-client network environment, or as a peer machine in a peer-to-peer (or distributed) network environment.

The computer system 2000 may be a server computer, a client computer, a personal computer (PC), a tablet PC, a smartphone, an internet of things (IoT) appliance, a network router, or any machine capable of executing instructions 2024 (sequential or otherwise) that specify actions to be taken by that machine. Further, while only a single computer system 2000 is illustrated, the term "computer system" shall also be taken to include any collection of computer systems that individually or jointly execute instructions 2024 to perform any one or more of the methodologies discussed herein.

The example computer system 2000 includes one or more processing units ("processors 2002" in FIG. 20). The set of one or more processors 2002 is, for example, one or more central processing units (CPUs), one or more graphics processing units (GPUs), one or more digital signal processors (DSPs), one or more state machines, one or more application specific integrated circuits (ASICs), one or more radio-frequency integrated circuits (RFICs), or any combination of these. If the set of the set of processors 2002 includes multiple processors, the processors may perform one or more operations collectively or individually. The set of processors 2002 also may be a controller. The controller may include a non-transitory computer readable storage medium that may store program code to perform operations.

The set of processors 2002 should be understood that the corresponding functionality may be distributed among multiple processors using various ways, including using multi-core processors, assigning certain operations to specialized processors (e.g., graphics processing units), and dividing operations across a distributed computing environment. Any reference to the set of processors 2002 should be construed to include such architectures.

The computer system 2000 also includes a main memory 2004. The computer system may include a storage unit 2016.

The processor 2002, memory 2004 and the storage unit 2016 communicate via a bus 2008.

In addition, the computer system 2000 can include a static memory 2006, a display driver 2010 (e.g., to drive a plasma display panel (PDP), a liquid crystal display (LCD), or a projector). The computer system 2000 may also include alphanumeric input device 2012 (e.g., a keyboard), a cursor control device 2014 (e.g., a mouse, a trackball, a joystick, a motion sensor, or other pointing instrument), a signal generation device 2018 (e.g., a speaker), and a network interface device 2020, which also are configured to communicate via the bus 2008.

The storage unit 2016 includes a machine-readable medium 2022 on which is stored instructions 2024 (e.g., software) embodying any one or more of the methodologies or functions described herein. The instructions 2024 may also reside, completely or at least partially, within the main memory 2004 or within the processor 2002 (e.g., within a processor's cache memory) during execution thereof by the computer system 2000, the main memory 2004 and the processor 2002 also constituting machine-readable media. The instructions 2024 may be transmitted or received over a network 2026 via the network interface device 2020.

While machine-readable medium 2022 is shown in an example embodiment to be a single medium, the term "machine-readable medium" should be taken to include a single medium or multiple media (e.g., a centralized or distributed database, or associated caches and servers) able to store the instructions 2024. The term "machine-readable medium" shall also be taken to include any medium that is capable of storing instructions 2024 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Embodiments can include every combination and permutation of the various system components and the various method processes.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. An integrated monopile system comprising:

an outer monopile installed in an earthen substrate;

a nuclear reactor;

an inner sleeve contained within the outer monopile that is installed in the earthen substrate, the inner sleeve comprising:

at least one side wall;

an open top end;

a closed bottom end; and a cavity formed within the at least one side wall, the open top end, and the closed bottom end, the cavity housing the nuclear reactor positioned inside the inner sleeve on or adjacent to the closed bottom end, the nuclear reactor being accessible through the open top end; and a spent fuel storage container housed in the inner sleeve, wherein the inner sleeve houses the spent fuel storage container at the closed bottom end, the spent fuel storage container holding spent nuclear fuel from the nuclear reactor.

2. The integrated monopile system of claim 1, wherein the cavity holds liquid and the nuclear reactor is at least partially submerged in the liquid.

3. The integrated monopile system of claim 2, wherein:
the outer monopile is additionally installed in a body of water, wherein the earthen substrate is below the body of water; and
the liquid in the cavity of the inner sleeve is below a top surface of the body of water outside of the outer monopile.

4. The integrated monopile system of claim 1, wherein the cavity of the inner sleeve is watertight.

5. The integrated monopile system of claim 1, wherein:
the outer monopile is additionally installed in a body of water, wherein the earthen substrate is below the body of water;
a top end of the outer monopile is above the body of water; and
the open top end of the inner sleeve is above the body of water.

6. The integrated monopile system of claim 1, wherein the width of the cavity of the inner sleeve is less than the height of the nuclear reactor.

7. The integrated monopile system of claim 1, wherein the cavity houses a single nuclear reactor.

8. The integrated monopile system of claim 1, wherein the nuclear reactor is offset from the center of the cavity.

9. The integrated monopile system of claim 1, wherein the inner sleeve in the outer monopile forms an annular cavity.

10. The integrated monopile system of claim 1, wherein the inner sleeve in the outer monopile forms an annular configuration.

11. The integrated monopile system of claim 1, wherein the inner sleeve is concentrically contained within the outer monopile.

12. The integrated monopile system of claim 1, further comprising a base configured to sit on the earthen substrate below the inner sleeve and within the outer monopile.

13. An integrated monopile system comprising:
an outer monopile installed in an earthen substrate;
a nuclear reactor; and
an inner sleeve contained within the outer monopile that is installed in the earthen substrate,
the inner sleeve comprising:
at least one side wall;
an open top end;
a closed bottom end; and
a cavity formed within the at least one side wall, the open top end, and the closed bottom end, the cavity housing the nuclear reactor positioned inside the inner sleeve on or adjacent to the closed bottom end, the nuclear reactor being accessible through the open top end,
wherein:
the outer monopile is additionally installed in a body of water;
the earthen substrate is below the body of water;
a top end of the outer monopile is above the body of water;
the open top end of the inner sleeve is above the body of water; and
the inner sleeve houses the nuclear reactor below a top surface of the body of water.

14. The integrated monopile system of claim 13, wherein the inner sleeve houses the nuclear reactor below a surface of the earthen substrate that is outside of the outer monopile.

15. The integrated monopile system of claim 13, further comprising:
a spent fuel storage container housed in the inner sleeve, wherein the inner sleeve houses the spent fuel storage container at the closed bottom end, the spent fuel storage container holding spent nuclear fuel from the nuclear reactor.

16. The integrated monopile system of claim 15, wherein the spent fuel storage container is arranged along an edge of the cavity formed by the at least one side wall and the closed bottom end.

17. A system comprising:
an outer monopile installed in an earthen substrate and in a body of water, the earthen substrate being below the body of water, the outer monopile comprising:
an open first top end, an open bottom end, and at least one first side wall, wherein the at least one first side wall surrounds a first cavity within the outer monopile, and the open bottom end is installed in the earthen substrate;
an inner sleeve contained within the outer monopile, the inner sleeve comprising:
an open second top end, a closed bottom end, and at least one second side wall, wherein the at least one second side wall of the inner sleeve surrounds a second cavity within the inner sleeve;
a base within the outer monopile and between the earthen substrate and the closed bottom end of the inner sleeve;
a lid installed on the open second top end of the inner sleeve; and
a nuclear reactor configured to pass through the open second top end of the inner sleeve, wherein the nuclear reactor is housed in the second cavity of the inner sleeve at a position on or adjacent to the closed bottom end, and the nuclear reactor is located below a top surface of the earthen substrate that is outside of the outer monopile.

* * * * *